United States Patent
Loc et al.

(10) Patent No.: US 7,570,612 B1
(45) Date of Patent: Aug. 4, 2009

(54) MULTI-BAND COMMUNICATIONS FOR A SINGLE WIRELESS BASE STATION

(75) Inventors: Peter Loc, Cupertino, CA (US); Foo Keong Tang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 876 days.

(21) Appl. No.: 10/936,348

(22) Filed: Sep. 7, 2004

(51) Int. Cl.
*H04Q 7/00* (2006.01)
(52) U.S. Cl. .................. 370/328; 370/329; 370/330; 370/331; 370/332; 370/339
(58) Field of Classification Search ................ 370/328, 370/329, 330, 331–339, 278, 282, 412
See application file for complete search history.

(56) References Cited

U.S. PATENT DOCUMENTS

| | | | | |
|---|---|---|---|---|
| 5,973,609 | A * | 10/1999 | Schoch | 370/449 |
| 6,795,418 | B2 * | 9/2004 | Choi | 370/336 |
| 7,248,570 | B2 * | 7/2007 | Bahl et al. | 370/329 |
| 7,327,258 | B2 * | 2/2008 | Fast et al. | 340/572.1 |
| 2003/0188006 | A1 * | 10/2003 | Bard | 709/232 |
| 2004/0184475 | A1 * | 9/2004 | Meier | 370/449 |
| 2004/0196812 | A1 * | 10/2004 | Barber | 370/334 |
| 2004/0203566 | A1 * | 10/2004 | Leung | 455/404.1 |
| 2005/0147055 | A1 * | 7/2005 | Stephens | 370/310 |
| 2005/0190738 | A1 * | 9/2005 | Smavatkul et al. | 370/346 |
| 2005/0239474 | A9 * | 10/2005 | Liang | 455/454 |
| 2005/0249227 | A1 * | 11/2005 | Wang et al. | 370/412 |
| 2006/0062189 | A1 * | 3/2006 | Takeuchi | 370/338 |
| 2007/0002804 | A1 * | 1/2007 | Xiong et al. | 370/335 |

OTHER PUBLICATIONS

"Draft 802.20 Permanent Document; System Requirements for IEEE 802.20 Mobile Broadband Wireless Access Systems—Version 14," Jul. 16, 2004, pp. 1-23, IEEE 802.20-PD-06/ V<14>, IEEE, United States.

"802.16 IEEE Standard for Local and Metropolitan Area Networks; Part 16; Air Interface for Fixed Broadband Wireless Access Systems," 802.16 IEEE Standard for Local and Metropolitan Area Networks, Oct. 1, 2004, pp. i-xxxiv and pp. 1-857, IEEE Std 802.16-2004, IEEE, United States.

* cited by examiner

*Primary Examiner*—Alexander Eisen
*Assistant Examiner*—Julio R Perez

(57) ABSTRACT

A wireless network apparatus and corresponding method and computer program comprises channel queues each to store packets of data to be transmitted on a respective wireless channel in one of a plurality of frequency bands; a memory to store a channel access time value and a return to channel value for each of the wireless channels; and a controller to select one of the wireless channels according to a channel polling scheme, and on that channel, cause a start beacon packet to be sent, exchange packets of data for an interval specified by the channel access time value, cause a stop beacon packet to be sent at the end of the interval specified by the channel access time value, and cause a further start beacon packet to be sent at the end of an interval specified by the return to channel value.

266 Claims, 9 Drawing Sheets

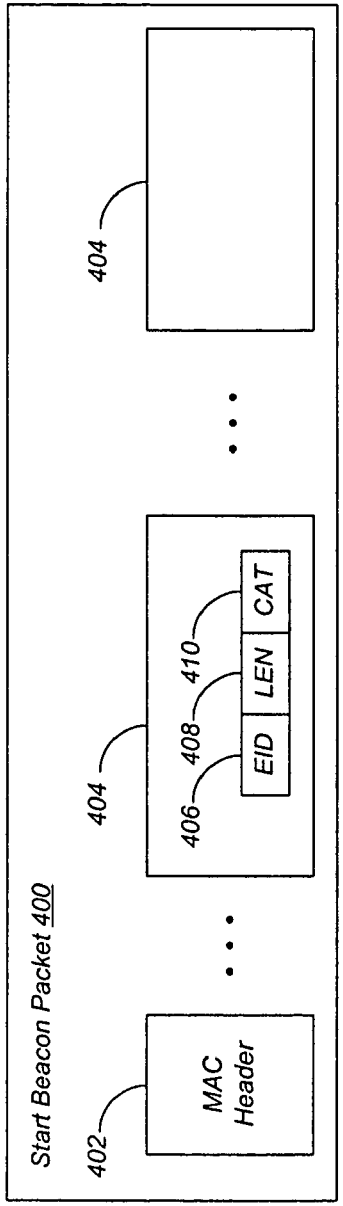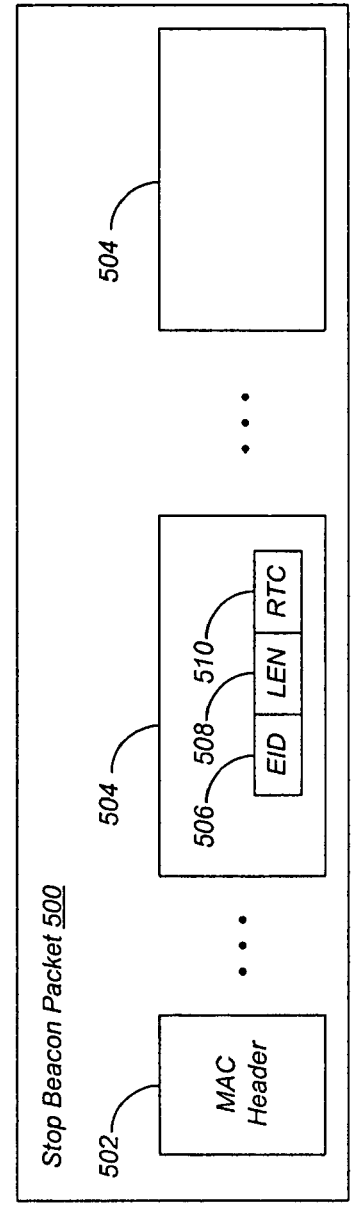

MULTI-BAND COMMUNICATIONS FOR A SINGLE WIRELESS BASE STATION

BACKGROUND

The present invention relates generally to wireless communications networks. More particularly, the present invention relates to multi-band communications for a single wireless base station.

Wireless communications networks are enjoying rapidly increasing popularity, especially in the small office/home office environment, and even at home. However, multiple frequency bands are available for such networks, and band-specific equipment is required for each. For example, the IEEE standard 802.11 specifies a 2.4 GHz frequency band, while the IEEE standard 802.11a specifies a 5 GHz frequency band. Conventional network devices designed for one band are unable to communicate with network devices in another band.

SUMMARY

In general, in one aspect, the invention features a wireless network apparatus and corresponding method and computer program. It comprises a plurality of channel queues each to store packets of data to be transmitted on a respective wireless channel in one of a plurality of frequency bands, wherein at least two of the channel queues correspond to wireless channels in different ones of the frequency bands; a memory to store a channel access time value and a return to channel value for each of the wireless channels; and a controller to select one of the wireless channels according to a channel polling scheme, cause a start beacon packet to be sent to the selected one of the wireless channels, exchange packets of data with the selected one of the wireless channels for an interval specified by the channel access time value for the selected one of the wireless channels, cause a stop beacon packet to be sent to the selected one of the wireless channels at the end of the interval specified by the channel access time value for the selected one of the wireless channels, and cause a further start beacon packet to be sent to the selected one of the wireless channels at the end of an interval specified by the return to channel value for the selected one of the wireless channels.

Particular implementations can include one or more of the following features. The start beacon packet comprises the channel access time value for the selected one of the wireless channels. The interval specified by the channel access time value begins with receipt of the start beacon packet. The stop beacon packet comprises the return to channel value for the selected one of the wireless channels. The interval specified by the return to channel value begins with receipt of the stop beacon packet. One of the frequency bands is a 2.4 GHz band; and another of the frequency bands is a 5 GHz band. The 2.4 GHz band complies with IEEE standard 802.11; and the 5 GHz band complies with IEEE standard 802.11a. The channel polling scheme is an adaptive scheme based on traffic patterns learned by the controller. A media access controller comprises the wireless network apparatus. A wireless access point comprises the media access controller. Implementations comprise a physical-layer device comprising a plurality of wireless transceivers each to communicate over one of the wireless channels. Implementations comprise a media access controller to exchange packets of data with a wired network. The wireless network apparatus is otherwise compliant with at least one standard selected from the group consisting of IEEE standards 802.11, 802.11a, 802.11b, 802.11g, 802.11n, 802.16, and 802.20.

In general, in one aspect, the invention features a wireless network apparatus and corresponding method and computer program. It comprises a plurality of channel queues each to store packets of data to be transmitted on a respective wireless channel in one of a plurality of frequency bands, wherein at least two of the channel queues correspond to wireless channels in different ones of the frequency bands; a memory to store a channel access time value for each of the wireless channels; and a controller to select one of the wireless channels according to a channel polling scheme, cause a start beacon packet to be sent to the selected one of the wireless channels, wherein the start beacon packet comprises the channel access time value for the selected one of the wireless channels, and exchange packets of data with the selected one of the wireless channels for an interval specified by the channel access time value for the selected wireless channel.

Particular implementations can include one or more of the following features. One of the frequency bands is a 2.4 GHz band; and another of the frequency bands is a 5 GHz band. The 2.4 GHz band complies with IEEE standard 802.11; and the 5 GHz band complies with IEEE standard 802.11a. The interval specified by the channel access time value begins with receipt of the start beacon packet. The channel polling scheme is an adaptive scheme based on traffic patterns learned by the controller. A media access controller comprises the wireless network apparatus. A wireless access point comprises the media access controller. Implementations comprise a physical-layer device comprising a plurality of wireless transceivers each to communicate over one of the wireless channels. Implementations comprise a media access controller to exchange packets of data with a wired network. The wireless network apparatus is otherwise compliant with at least one standard selected from the group consisting of IEEE standards 802.11, 802.11a, 802.11b, 802.11g, 802.11n, 802.16, and 802.20.

In general, in one aspect, the invention features a wireless network apparatus and corresponding method and computer program. It comprises a plurality of channel queues each to store packets of data to be transmitted on a respective wireless channel in one of a plurality of frequency bands, wherein at least two of the channel queues correspond to wireless channels in different ones of the frequency bands; a memory to store a return to channel value for each of the wireless channels; and a controller to select one of the wireless channels according to a channel polling scheme; and exchange packets of data with the selected one of the wireless channels for a predetermined interval, cause a stop beacon packet to be sent to the selected one of the wireless channels at the end of the predetermined interval, wherein the stop beacon packet comprises the return to channel value for the selected one of the wireless channels; and resume exchanging packets of data with the selected one of the wireless channels after an interval specified by the return to channel value for the selected one of the wireless channels.

Particular implementations can include one or more of the following features. One of the frequency bands is a 2.4 GHz band; and another of the frequency bands is a 5 GHz band. The 2.4 GHz band complies with IEEE standard 802.11; and the 5 GHz band complies with IEEE standard 802.11a. The interval specified by the return to channel value begins with receipt of the stop beacon packet. The channel polling scheme is an adaptive scheme based on traffic patterns learned by the controller. A media access controller comprises the wireless network apparatus. A wireless access point comprises the media access controller. Implementations comprise a physical-layer device comprising a plurality of wireless transceivers each to communicate over one of the wireless channels.

Implementations comprise a media access controller to exchange packets of data with a wired network. The wireless network apparatus is otherwise compliant with at least one standard selected from the group consisting of IEEE standards 802.11, 802.11a, 802.11b, 802.11g, 802.11n, 802.16, and 802.20.

In general, in one aspect, the invention features a wireless network apparatus and corresponding method and computer program. It comprises an infrastructure controller to exchange packets of data with a wireless base station over a wireless channel, and to receive start beacon packets and stop beacon packets from the wireless base station; an ad hoc controller to exchange packets of data with one or more wireless end stations over the wireless channel; and a master controller to cause the infrastructure controller to exchange packets of data with the wireless base station over the wireless channel only after receiving one of the start beacon packets and before receiving a next one of the stop beacon packets, and to cause the ad hoc controller to exchange packets of data with the one or more wireless end stations over the wireless channel only after receiving one of the stop beacon packets and before receiving a next one of the start beacon packets.

Particular implementations can include one or more of the following features. The start beacon packet comprises a channel access time value; and the master controller causes the infrastructure controller to exchange packets of data with the wireless base station over the wireless channel only during an interval specified by the channel access time value. The interval specified by the channel access time value begins with receipt of the start beacon packet. The stop beacon packet comprises a return to channel value; and the master controller causes the ad hoc controller to exchange packets of data with the one or more wireless end stations over the wireless channel only during an interval specified by the return to channel value. The interval specified by the return to channel value begins with receipt of the stop beacon packet. A media access controller comprises the wireless network apparatus. A wireless client comprises the media access controller. Implementations comprise a physical-layer device comprising a wireless transceiver to communicate over the wireless channel. The wireless network apparatus is otherwise compliant with at least one standard selected from the group consisting of IEEE standards 802.11, 802.11a, 802.11b, 802.11g, 802.11n, 802.16, and 802.20.

In general, in one aspect, the invention features a wireless network apparatus and corresponding method and computer program. It comprises an infrastructure controller to exchange packets of data with a wireless base station over a wireless channel, and to receive start beacon packets and stop beacon packets from the wireless base station; and a master controller to cause the infrastructure controller to exchange packets of data with the wireless base station over the wireless channel only after receiving one of the start beacon packets and before receiving a next one of the stop beacon packets, and to cause the wireless network apparatus to enter a sleep state on receiving one of the stop beacon packets, and to leave the sleep state on receiving a next one of the start beacon packets.

Particular implementations can include one or more of the following features. The start beacon packet comprises a channel access time value; and wherein the master controller causes the infrastructure controller to exchange packets of data with the wireless base station over the wireless channel only during an interval specified by the channel access time value. The interval specified by the channel access time value begins with receipt of the start beacon packet. The stop beacon packet comprises a return to channel value; and the master controller causes the wireless network apparatus to remain in the sleep state only during an interval specified by the return to channel value. The interval specified by the return to channel value begins with receipt of the stop beacon packet. A media access controller comprises the wireless network apparatus. A wireless client comprises the media access controller. Implementations comprise a physical-layer device comprising a wireless transceiver to communicate over the wireless channel. The wireless network apparatus is otherwise compliant with at least one standard selected from the group consisting of IEEE standards 802.11, 802.11a, 802.11b, 802.11g, 802.11n, 802.16, and 802.20.

In general, in one aspect, the invention features a wireless network apparatus and corresponding method and computer program. It comprises an infrastructure controller to exchange packets of data with a wireless base station over a wireless channel; an ad hoc controller to exchange packets of data with one or more wireless end stations over the wireless channel; wherein the infrastructure controller receives a start beacon packet from the wireless base station, the start beacon packet comprises a channel access time value; a memory to store the channel access time value; and a master controller to cause the infrastructure controller to exchange packets of data with the wireless base station over the wireless channel only during an interval specified by the channel access time value, and to cause the ad hoc controller to exchange packets of data with the one or more wireless end stations over the wireless channel thereafter.

Particular implementations can include one or more of the following features. The interval specified by the channel access time value begins with receipt of the start beacon packet. A media access controller comprises the wireless network apparatus.

A wireless client comprises the media access controller. Implementations comprise a physical-layer device comprising a wireless transceiver to communicate over the wireless channel. The wireless network apparatus is otherwise compliant with at least one standard selected from the group consisting of IEEE standards 802.11, 802.11a, 802.11b, 802.11g, 802.11n, 802.16, and 802.20.

In general, in one aspect, the invention features a wireless network apparatus and corresponding method and computer program. It comprises an infrastructure controller to exchange packets of data with a wireless base station over a wireless channel; wherein the infrastructure controller receives a start beacon packet from the wireless base station, the start beacon packet comprises a channel access time value; a memory to store the channel access time value; and a master controller to cause the infrastructure controller to exchange packets of data with the wireless base station over the wireless channel only during an interval specified by the channel access time value, and to cause the wireless network apparatus to operate in a sleep state thereafter.

Particular implementations can include one or more of the following features. The interval specified by the channel access time value begins with receipt of the start beacon packet. A media access controller comprises the wireless network apparatus. A wireless client comprises the media access controller. Implementations comprise a physical-layer device comprising a wireless transceiver to communicate over the wireless channel. The wireless network apparatus is otherwise compliant with at least one standard selected from the group consisting of IEEE standards 802.11, 802.11a, 802.11b, 802.11g, 802.11n, 802.16, and 802.20.

In general, in one aspect, the invention features a wireless network apparatus and corresponding method and computer program. It comprises an infrastructure controller to exchange packets of data with a wireless base station over a wireless channel; an ad hoc controller to exchange packets of data with one or more wireless end stations over the wireless channel; wherein the infrastructure controller receives a stop beacon packet from the wireless base station, the stop beacon packet comprises a return to channel value; a memory to store the return to channel value; and a master controller to cause the ad hoc controller to exchange packets of data with the one or more wireless end stations over the wireless channel only during an interval specified by the return to channel value, and to cause the infrastructure controller to exchange packets of data with the wireless base station over the wireless channel thereafter.

Particular implementations can include one or more of the following features. The interval specified by the return to channel value begins with receipt of the stop beacon packet. A media access controller comprises the wireless network apparatus. A wireless client comprises the media access controller. Implementations comprise a physical-layer device comprising a wireless transceiver to communicate over the wireless channel. The wireless network apparatus is otherwise compliant with at least one standard selected from the group consisting of IEEE standards 802.11, 802.11a, 802.11b, 802.11g, 802.11n, 802.16, and 802.20.

In general, in one aspect, the invention features a wireless network apparatus and corresponding method and computer program. It comprises an infrastructure controller to exchange packets of data with a wireless base station over a wireless channel; wherein the infrastructure controller receives a stop beacon packet from the wireless base station, the stop beacon packet comprises a return to channel value; a memory to store the return to channel value; and a master controller to cause the wireless network apparatus to operate in a sleep state only during an interval specified by the return to channel value, and to cause the infrastructure controller to exchange packets of data with the wireless base station over the wireless channel thereafter.

Particular implementations can include one or more of the following features. The interval specified by the return to channel value begins with receipt of the stop beacon packet. A media access controller comprises the wireless network apparatus. A wireless client comprises the media access controller. Implementations comprise a physical-layer device comprising a wireless transceiver to communicate over the wireless channel. The wireless network apparatus is otherwise compliant with at least one standard selected from the group consisting of IEEE standards 802.11, 802.11a, 802.11b, 802.11g, 802.11n, 802.16, and 802.20.

In general, in one aspect, the invention features a start beacon packet comprising a plurality of element fields, each element field comprising an element identification parameter, a length parameter, and an information parameter, wherein the information parameters comprise a service set identity (SSID) parameter; a supported rates parameter; a distribution set (DS) parameter set; a traffic information map (TIM) parameter; and a channel access time (CAT) parameter.

In general, in one aspect, the invention features a stop beacon packet comprising a plurality of element fields, each element field comprising an element identification parameter, a length parameter, and an information parameter, wherein the information parameters comprise a service set identity (SSID) parameter; a supported rates parameter; a distribution set (DS) parameter set; a traffic information map (TIM) parameter; and a return to channel (RTC) parameter.

The details of one or more implementations are set forth in the accompanying drawings and the description below. Other features will be apparent from the description and drawings, and from the claims.

DESCRIPTION OF DRAWINGS

FIG. 4 shows the format of a start beacon packet according to a preferred embodiment.

FIG. 5 shows the format of a stop beacon packet according to a preferred embodiment.

Figure 1:
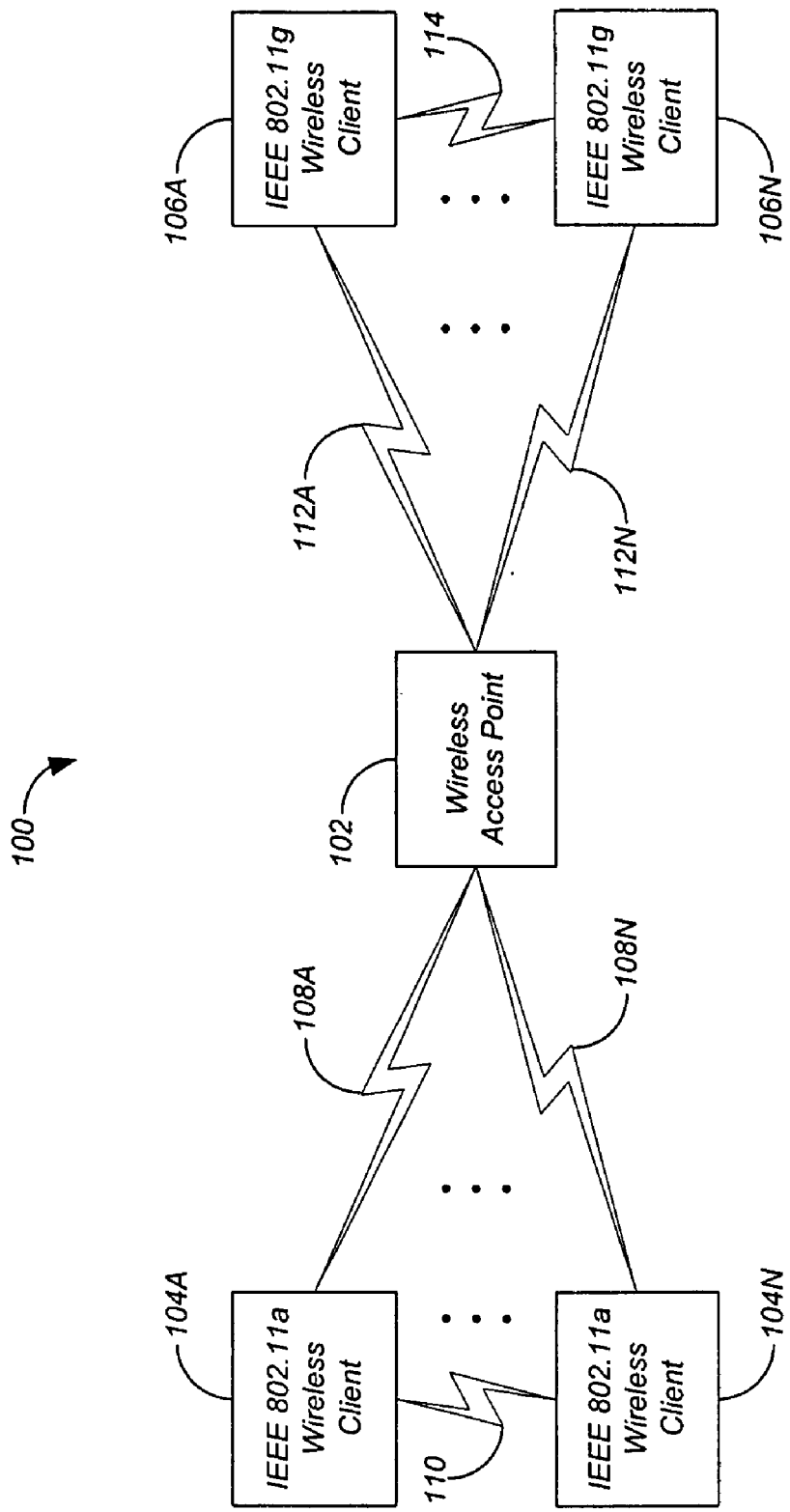
FIG. 1 shows a wireless network comprising a wireless access point, a plurality of wireless clients operating on one frequency band, and a further plurality of wireless clients operating on another frequency band.

The leading digit(s) of each reference numeral used in this specification indicates the number of the drawing in which the reference numeral first appears.

DETAILED DESCRIPTION

Embodiments of the present invention provide a wireless base station that is able to communicate with wireless network devices operating on a plurality of different frequency bands. For example, one embodiment provides a wireless access point that is compliant with both of IEEE standards 802.11a and 802.11, which specify different frequency bands, and so is able to communicate with wireless network devices operating on both frequency bands. In addition, embodiments of the wireless base station enable wireless end stations, such as wireless clients, to communicate with each other via the base station even though the end stations operate on different frequency bands. Preferably the wireless access points are otherwise compliant with one or more of IEEE standards 802.11, 802.11a, 802.11b, 802.11g, 802.11n, 802.16, and 802.20.

Embodiments of the present invention also provide end stations that can both communicate with each other according to an ad hoc model, such as the ad hoc wireless network model specified by IEEE standard 802.11, and communicate with and via a wireless base station according to an infrastructure model, such as the infrastructure wireless network model specified by IEEE standard 802.11. Preferably the intervals during which the end stations operate according to each of these two models is controlled by the wireless base station using signals such as beacons. Preferably the wireless clients are otherwise compliant with one or more of IEEE standards 802.11, 802.11a, 802.11b, 802.11g, 802.11n, 802.16, and 802.20.

FIG. 1 shows a wireless network 100 comprising a wireless access point 102, a plurality of wireless clients 104A through 104N operating on one frequency band such as a 2.4 GHz band such as that specified by IEEE standard 802.11, and a plurality of wireless clients 106A through 106N operating on another frequency band such as a 5 GHz band such as that specified by IEEE standard 802.11a. While embodiments of the present invention are described in terms of IEEE standard networks, wireless access points, and wireless clients, it will be understood by those skilled in the relevant arts after reading this description that the principles of the present invention extend to other sorts of wireless networks, wireless base stations, and wireless end stations.

Clients 104 and 106 are able to communicate in both ad hoc and infrastructure modes, as described in detail below. Thus the signals 108A through 108N exchanged between wireless access point 102 and wireless clients 104, as well as the signals 110 exchanged between clients 104, have carrier center frequencies in the 2.4 GHz band. Similarly, the signals 112A through 112N exchanged between wireless access point 102 and wireless clients 106, as well as the signals 114 exchanged between clients 106, have carrier center frequencies in the 5 GHz band.

Figure 2:
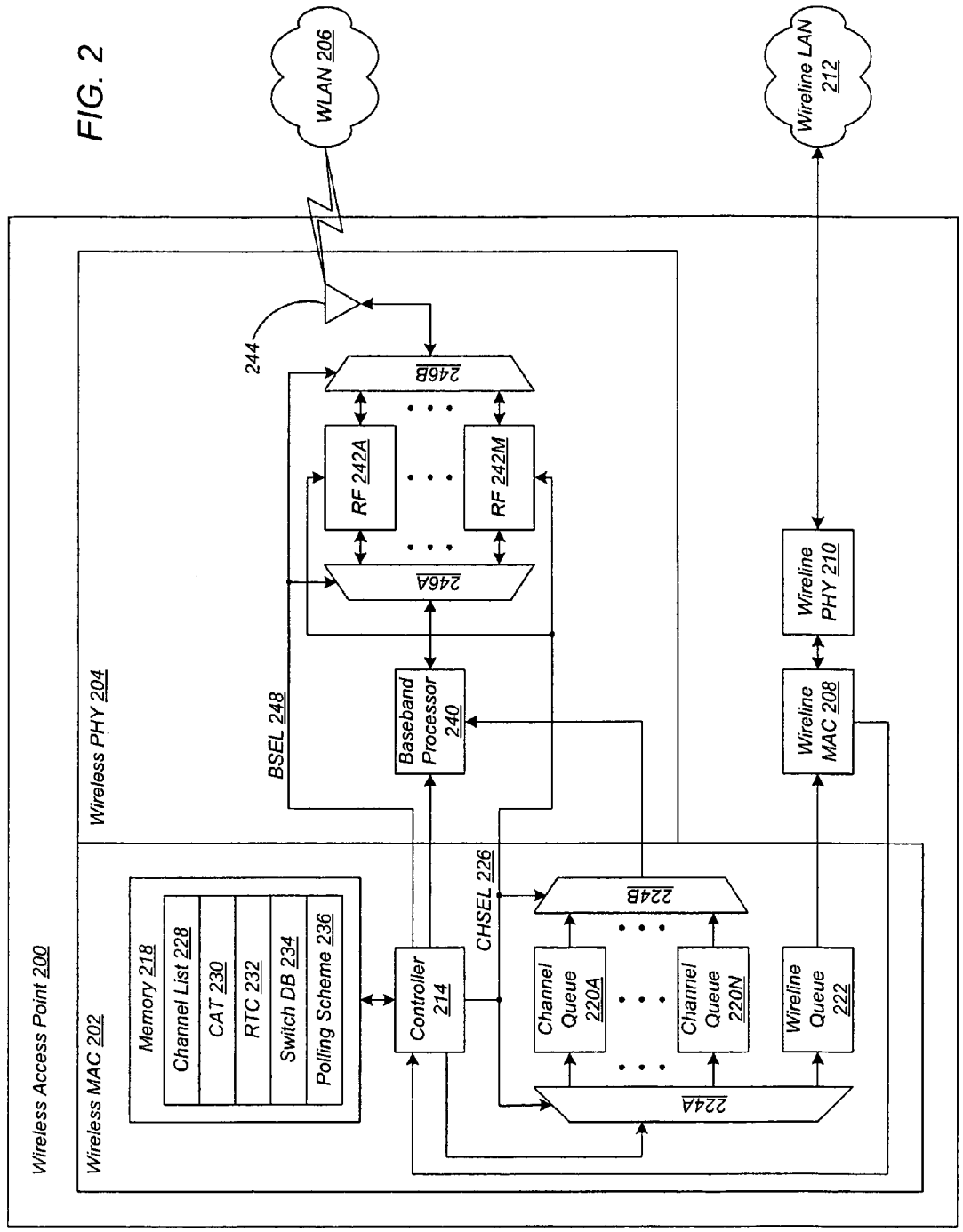
FIG. 2 shows a wireless access point according to a preferred embodiment of the present invention.

FIG. 2 shows a wireless access point 200 according to a preferred embodiment of the present invention. Other embodiments of the present invention provide wireless base stations with similar configurations. Wireless access point 200 comprises a wireless media access controller (MAC) 202, a wireless physical-layer device (PHY) 204 in communication with a wireless local-area network (WLAN) 206 or the like, a wireline MAC 208 such as an Ethernet MAC, and a wireline PHY 210 such as an Ethernet PHY in communication with a wireline network 212 such as an Ethernet wide-area network (WAN), LAN, or the like.

Wireless MAC 202 comprises a controller 214, a memory 218, a plurality of channel queues 220A through 220N, a wireline network queue 222, and switches 224A and 224B such as multiplexers and demultiplexers that operate according to a channel select signal (CHSEL) signal 226. Each channel queue 220 stores packets of data to be transmitted over a corresponding channel in WLAN 206. Wireline queue 222 stores packets of data to be transmitted to wireline network 212. Channel queues 220 and wireline network queue 222 can be implemented within memory 218.

Memory 218 stores a channel list 228 that lists all of the channels available in all of the frequency bands in which access point 200 operates. Memory 218 also stores a channel access time (CAT) value 230 and/or a return to channel (RTC) value 232 for each channel. The CAT and RTC values are used to control the intervals at which wireless clients 104 and 106 operate in ad hoc and infrastructure modes, as described in detail below. The CAT and RTC values can be fixed values, or can be modified during operation.

Memory 218 also stores a switch database 234 that learns the band and channel upon which each wireless client 104 and 106 is currently operating according to well-known methods. Memory 218 optionally stores a channel polling scheme 236, which in other embodiments can be implemented directly within controller 214.

Wireless PHY 204 comprises a baseband processor 240, a plurality of radio-frequency (RF) transceivers 242A through 242M, an antenna 244, and switches 246A and 246B such as multiplexers and demultiplexers that operate according to a band select signal (BSEL) signal 248.

Figure 3:
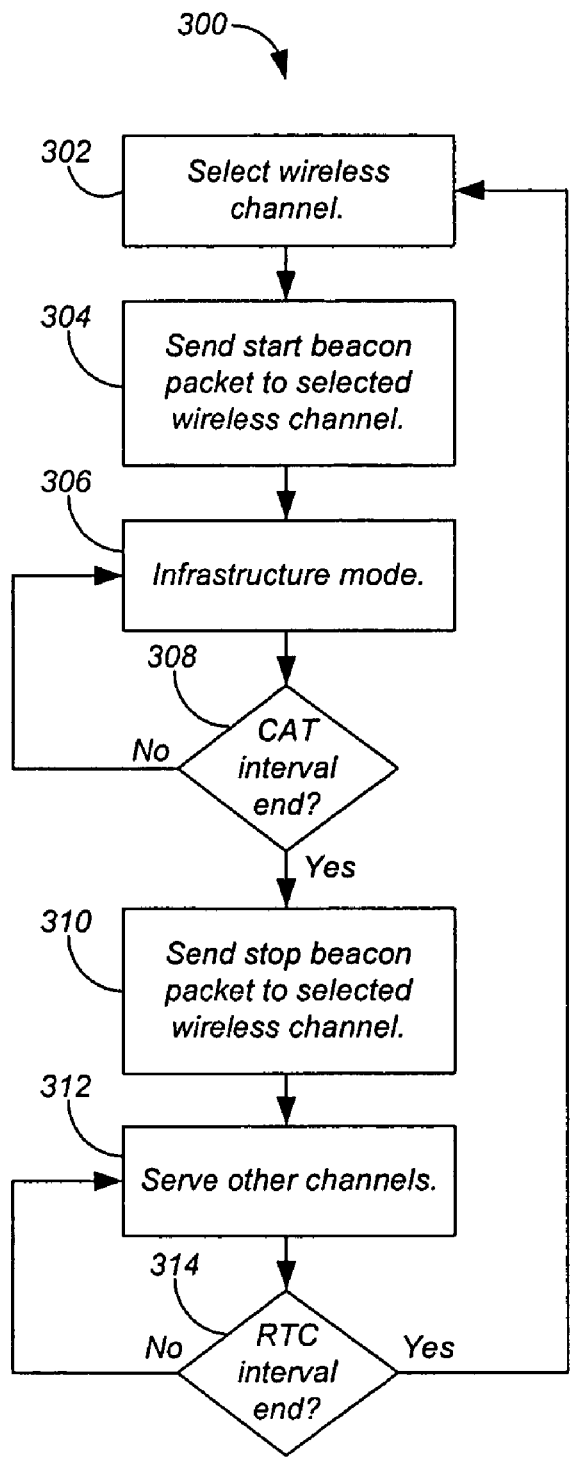
FIG. 3 shows a process for the wireless access point of FIG. 2 according to a preferred embodiment of the present invention.

FIG. 3 shows a process 300 for wireless access point 200 of FIG. 2 according to a preferred embodiment of the present invention. Other embodiments of the present invention provide similar processes for other types of wireless base stations.

Controller 214 selects one of the wireless channels identified in channel list 228 according to channel polling scheme 236 (step 302). Referring again to FIG. 2, controller 214 asserts channel select signal (CHSEL) 226 and band select signal (BSEL) 248 to identify the channel and the frequency band for the channel.

Any sort of channel polling scheme can be used. For example, in a round-robin polling scheme, the channels are polled according to their listing order in channel list 228. As another example, in a priority scheme the channels are prioritized, for example according to the type of traffic carried. Channels that carry low-latency traffic such as voice data could have high priorities, while channels for Internet access or file downloads could have lower priorities. In addition, the priorities could be weighted. Controller 214 then selects channels having high priorities more often than those with low priorities. As another example, a user-selected scheme could be used, in which the user selects the polling scheme, for example by entering some channels more than once in channel list 228 to achieve non-uniform spreading of traffic. As another example, an adaptive scheme could be used in which controller 214 determines when and how often to switch to each channel based on learned traffic patterns, the types of devices operating on the channels, and the like. For example, if controller 214 learns that no devices are operating on the IEEE 802.11g band, it can cease to poll the channels in that band, except for infrequent polling to detect new devices.

Controller 214 causes a start beacon packet to be sent to the selected wireless channel (step 304). In response to the CHSEL and BSEL signals, the RF transceiver 242 for the selected channel and band transmits the start beacon packet. The start beacon packet optionally comprises the channel access time (CAT) value for the selected wireless channel.

The start beacon packet indicates to the wireless clients that the wireless clients must now communicate with the wireless access point according to an infrastructure network model, such as the infrastructure wireless network model specified by IEEE standard 802.11.

FIG. 4 shows the format of a start beacon packet 400 according to a preferred embodiment. Start beacon packet 400 comprises a conventional MAC header 402 and a plurality of element fields 404. Each element field comprises an element identification parameter (EID) 406, a length parameter (LEN) 408, and one of a plurality of information parameters 410. The information parameters include a service set identity (SSID) parameter; a supported rates parameter; a distribution set (DS) parameter set; a traffic information map (TIM) parameter, as is well-known in the relevant arts. In addition to such conventional information parameters 410, start beacon packet 400 includes an information parameter 410 representing the CAT value for the channel. For example, the CAT value can be placed in an element field 404 reserved for a generic element or the like. Wireless clients monitor this field to determine the CAT value for the channel, as described in detail below.

Controller 214 then exchanges packets of data with the selected wireless channel according to the infrastructure network model for an interval specified by the CAT value for the selected wireless channel (step 306). Switch 224B selects the channel queue 220 for the selected wireless channel according to CHSEL signal 226. Baseband processor 240 receives packets from the channel queue 220. Switch 246A passes the packets to the proper RF transceiver 242 according to BSEL signal 248. The selected RF transceiver 242 transmits a signal representing the packets via switch 246B and antenna 244 to WLAN 206.

Packets received by MAC 202 from the selected wireless channel are fed by controller 214 to the proper destination channel queue 220 according to switch database 234. That is, controller 214 learns the channel on which each wireless client operates, and populates switch database 234 according to methods well-known in the relevant arts. When a packet is received, controller 214 consults switch database 234 to determine the channel on which the intended destination device operates, and places the packet in the channel queue 220 for that channel. If the packet is addressed to wireline network 212, controller 214 places the packet in wireline queue 222, where the packet is subsequently transmitted to wireline network 212 by wireline MAC 208 and wireline PHY 210. Packets received from wireline network 212 are placed into the proper channel queue 220 by a similar process.

At the end of the interval specified by the CAT value for the selected wireless channel (step 308), controller 214 causes a stop beacon packet to be sent to the selected wireless channel (step 310). In response to the CHSEL and BSEL signals, the RF transceiver 242 for the selected channel and band transmits the stop beacon packet. The stop beacon packet optionally comprises the return to channel (RTC) value for the selected wireless channel.

The stop beacon packet indicates to the wireless clients that the wireless clients are now free to communicate with each other according to an ad hoc network model, such as the ad hoc wireless network model specified by IEEE standard 802.11, to enter a low-power sleep state, or to perform some other function.

FIG. 5 shows the format of a stop beacon packet 500 according to a preferred embodiment. Like start beacon packet 400, stop beacon packet 500 comprises a conventional MAC header 502 and a plurality of element fields 504, each comprising an element identification parameter (EID) 506, a length parameter (LEN) 508, and one of a plurality of information parameters 510. In addition to conventional information parameters 510, stop beacon packet 500 includes an information parameter 510 representing the RTC value for the channel. For example, the RTC value can be placed in an element field 504 reserved for a generic element or the like. Wireless clients monitor this field to determine the RTC value for the channel, as described in detail below.

During this interval wireless access point 200 serves other channels in a similar manner (step 312). In particular, controller 214 selects another channel, which can be in a different frequency band, and repeats process 300 for that channel, in turn serving the channels in channel list 228 according to polling scheme 236. At the end of the interval specified by the RTC value (step 314), process 300 resumes with step 302 for the wireless channel.

Figure 6:
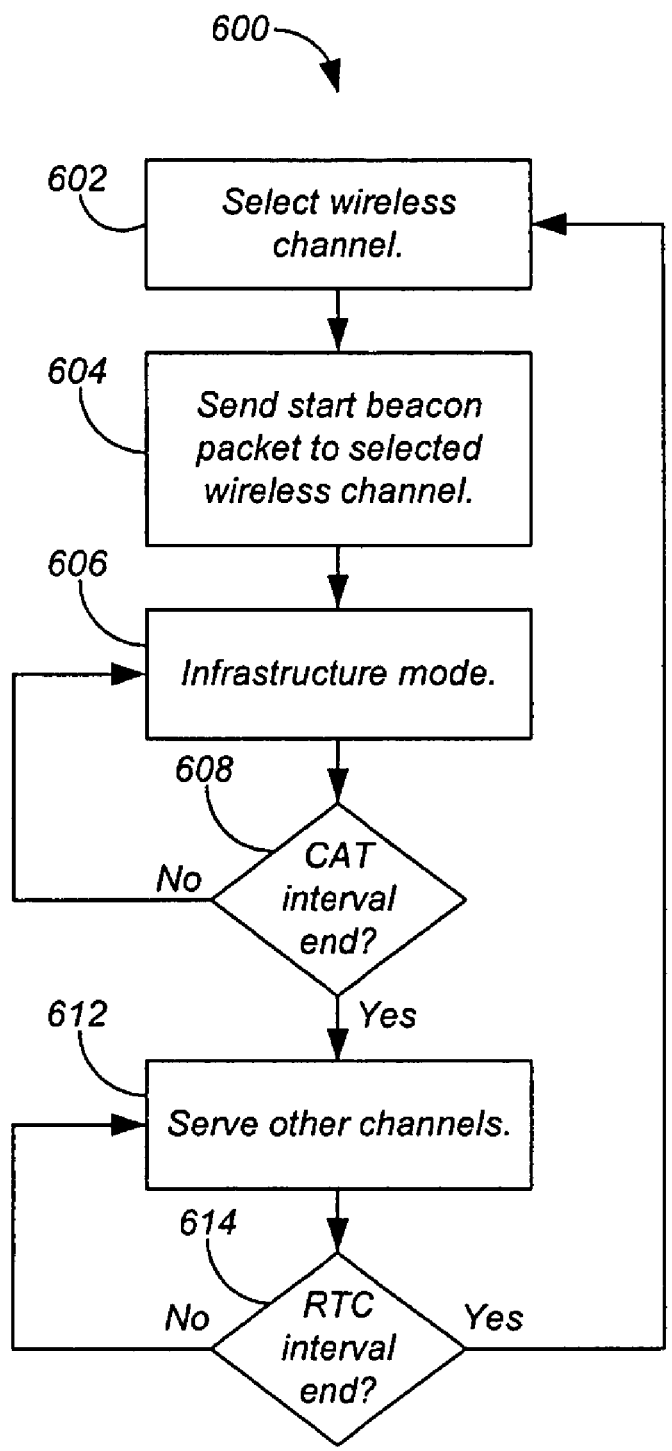
FIG. 6 shows a process for the wireless access point of FIG. 2 using a start beacon only according to a preferred embodiment of the present invention.

FIG. 6 shows a process 600 for wireless access point 200 of FIG. 2 using a start beacon only according to a preferred embodiment of the present invention. Other embodiments of the present invention provide similar processes for other types of wireless base stations.

Controller 214 selects one of the wireless channels identified in channel list 228 according to channel polling scheme 236 (step 602). Controller 214 causes a start beacon packet to be sent to the selected wireless channel (step 604). The start beacon packet comprises the channel access time (CAT) value for the selected wireless channel. The start beacon packet indicates to the wireless clients that the wireless clients must now communicate with the wireless access point according to an infrastructure network model, such as the infrastructure wireless network model specified by IEEE standard 802.11.

Controller 214 then exchanges packets of data with the selected wireless channel according to the infrastructure network model for an interval specified by the CAT value for the selected wireless channel (step 606), as described above. At the end of the interval specified by the CAT value for the selected wireless channel (step 608), process 600 resumes with step 602. In particular, controller 214 selects another channel, which can be in a different frequency band, and serves that channel in a similar manner, in turn serving the channels in channel list 228 according to polling scheme 236 (step 612). Meanwhile the wireless clients operating in the channel selected in step 602 are free to communicate with each other according to an ad hoc network model, such as the ad hoc wireless network model specified by IEEE standard 802.11, until they receive another start beacon from access point 200. After an interval specified by the RTC value for a wireless channel (step 614), controller 214 returns to the channel (step 602).

Figure 7:
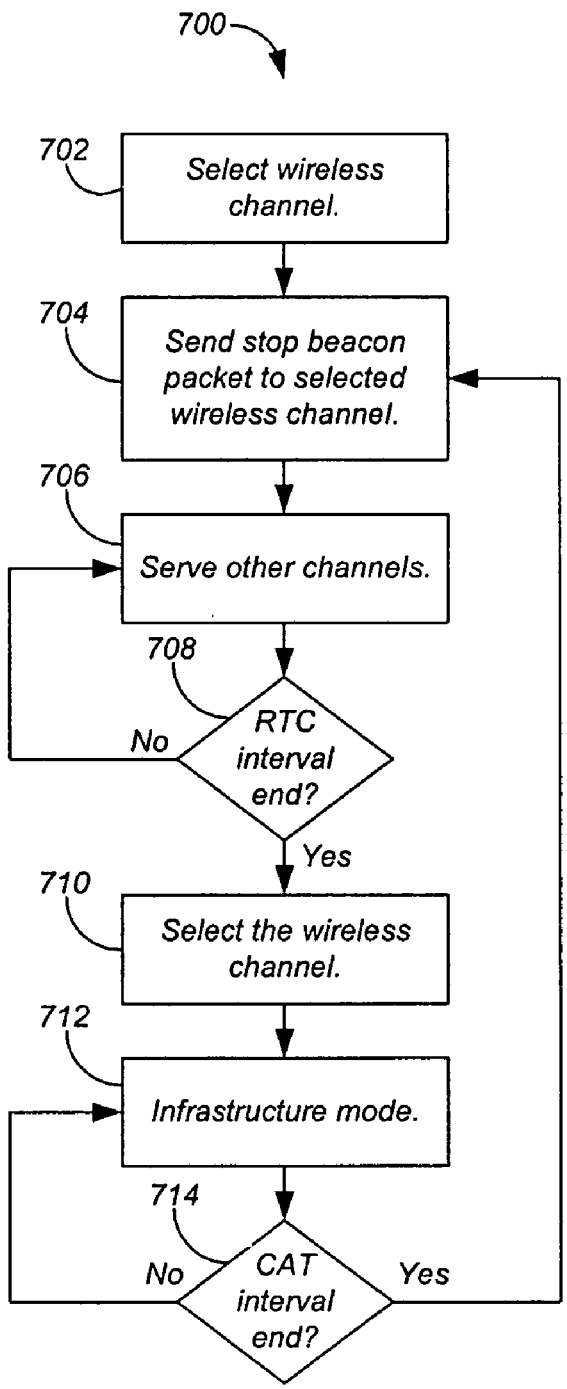
FIG. 7 shows a process for the wireless access point of FIG. 2 using a stop beacon only according to a preferred embodiment of the present invention.

FIG. 7 shows a process 700 for wireless access point 200 of FIG. 2 using a stop beacon only according to a preferred embodiment of the present invention. Other embodiments of the present invention provide similar processes for other types of wireless base stations.

Controller 214 selects one of the wireless channels identified in channel list 228 according to channel polling scheme 236 (step 702). Controller 214 causes a stop beacon packet to be sent to the selected wireless channel (step 704). The stop beacon packet comprises the return to channel (RTC) value for the selected wireless channel.

The stop beacon packet indicates to the wireless clients operating in the selected channel that the wireless clients are now free to communicate with each other according to an ad hoc network model, such as the ad hoc wireless network model specified by IEEE standard 802.11, to enter a low-power sleep state, or to perform some other function.

During the interval specified by the RTC value, access point 200 serves other channels in channel list 228 according to channel polling scheme 236 (step 706). At the end of the interval specified by the RTC value (step 708), access point 200 selects the channel selected in step 702 (step 710).

Controller 214 then exchanges packets of data with the selected wireless channel according to an infrastructure network model, such as the infrastructure wireless network model specified by IEEE standard 802.11, for an interval specified by the CAT value for the selected wireless channel (step 712). At the end of the interval specified by the CAT value (step 714), access point 200 returns to step 704 to transmit another stop beacon, and repeats process 700.

Figure 8:
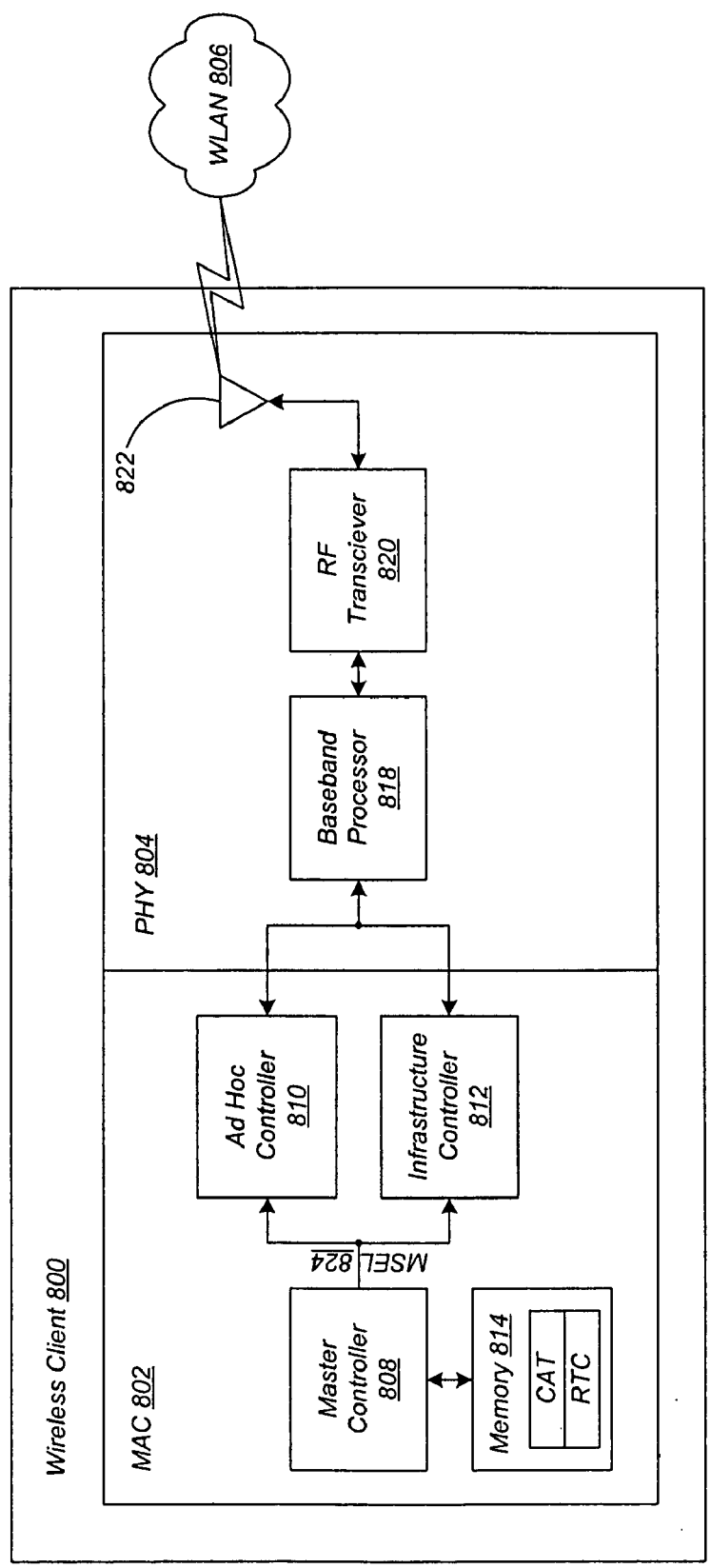
FIG. 8 shows a wireless client according to a preferred embodiment of the present invention.

FIG. 8 shows a wireless client 800 according to a preferred embodiment of the present invention. Other embodiments of the present invention provide wireless end stations with similar configurations. Wireless client 800 comprises a MAC 802 and a PHY 804 in communication with a WLAN 806. MAC 802 comprises a master controller 808, an ad hoc controller 810, an infrastructure controller 812, and a memory 814. PHY 804 comprises a baseband processor 818, an RF transceiver 820, and an antenna 822.

Figure 9:
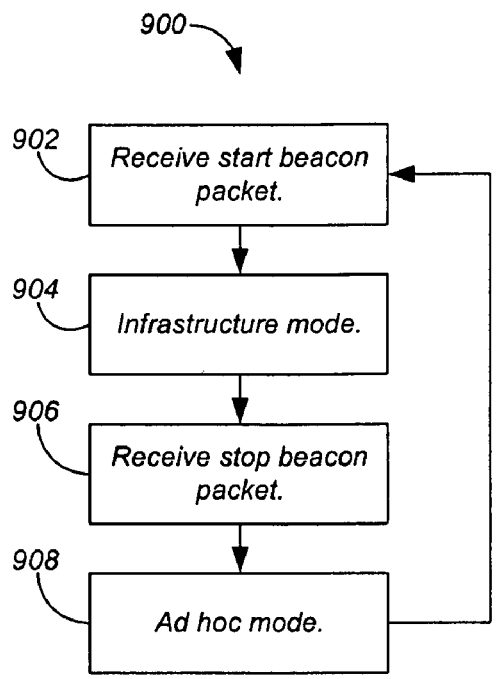
FIG. 9 shows a process for the wireless client of FIG. 8 according to a preferred embodiment of the present invention.

FIG. 9 shows a process 900 for wireless client 800 of FIG. 8 according to a preferred embodiment of the present invention. Other embodiments of the present invention provide similar processes for other types of wireless end stations.

Wireless client 800 receives a start beacon packet from a wireless access point (step 902). The start beacon optionally comprises a CAT value, as described above. Wireless client

800 stores the CAT value in memory 814. The start beacon packet indicates to wireless client 800 that wireless client 800 now must communicate with the wireless access point according to an infrastructure network model, such as the infrastructure wireless network model specified by IEEE standard 802.11.

In response to the start beacon packet, master controller 808 selects infrastructure controller 812 by asserting an infrastructure state of mode select (MSEL) signal 824. In response, infrastructure controller 812 exchanges packets of data with the wireless access point according to an infrastructure network model (step 904).

Wireless client 800 later receives a stop beacon packet from the wireless access point (step 906). The stop beacon optionally comprises a RTC value, as described above. Wireless client 800 stores the RTC value in memory 814. The stop beacon packet indicates to wireless client 800 that wireless client 800 is now free to communicate with other wireless clients in its channel according to an ad hoc network model, such as the ad hoc wireless network model specified by IEEE standard 802.11, to enter a low-power sleep state, or to perform some other function.

In embodiments where the start beacon packet comprises the CAT value, wireless client 800 can rely on the CAT value rather than upon receipt of a subsequent stop beacon packet. That is, infrastructure controller 812 exchanges packets of data with the wireless access point for an interval beginning with receipt of the start beacon packet and having a duration represented by the CAT value. This provides redundancy in case wireless client 800 does not properly receive the stop beacon packet. In other embodiments, wireless client 800 can rely upon either receipt of the stop beacon packet or expiration of the CAT interval, whichever occurs first (or last).

In response to the stop beacon packet (or expiration of the CAT interval), master controller 808 selects ad hoc controller 810 by asserting an ad hoc state of mode select (MSEL) signal 824. In response, ad hoc controller 810 exchanges packets of data with other wireless clients according to an ad hoc network model (step 908). Alternatively, master controller 808 can cause wireless client 800 to enter a low-power sleep state, or to perform some other function.

Wireless client 800 later receives another start beacon packet from the wireless access point (step 902), which optionally comprises a CAT value, as described above. In embodiments where the stop beacon packet comprises the RTC value, wireless client 800 can rely on the RTC value rather than upon receipt of a subsequent start beacon packet. That is, ad hoc controller 810 exchanges packets of data with other wireless clients in its channel for an interval beginning with receipt of the stop beacon packet and having a duration represented by the RTC value. This provides redundancy in case wireless client 800 does not properly receive the start beacon packet. In other embodiments, wireless client 800 can rely upon either receipt of the start beacon packet or expiration of the RTC interval, whichever occurs first (or last). Process 900 then repeats as described above.

Figure 10:
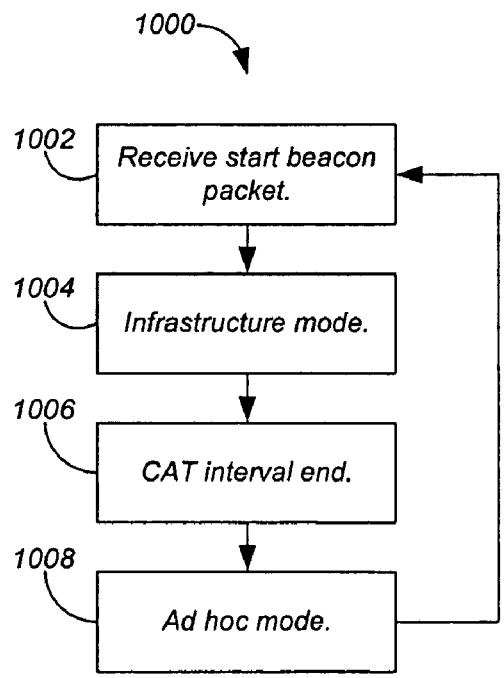
FIG. 10 shows a process for the wireless client of FIG. 8 using a start beacon only according to a preferred embodiment of the present invention.

FIG. 10 shows a process 1000 for wireless client 800 of FIG. 8 using a start beacon only according to a preferred embodiment of the present invention. Other embodiments of the present invention provide similar processes for other types of wireless end stations.

Wireless client 800 receives a start beacon packet from a wireless access point (step 1002). The start beacon comprises a CAT value, as described above. Wireless client 800 stores the CAT value in memory 814. The start beacon packet indicates to wireless client 800 that wireless client 800 now must communicate with the wireless access point according to an infrastructure network model, such as the infrastructure wireless network model specified by IEEE standard 802.11.

In response to the start beacon packet, master controller 808 selects infrastructure controller 812 by asserting an infrastructure state of mode select (MSEL) signal 824. In response, infrastructure controller 812 exchanges packets of data with the wireless access point according to an infrastructure network model (step 1004).

At the end of an interval beginning with receipt of the start beacon packet and having a duration specified by the CAT value (step 1006), master controller 808 selects ad hoc controller 810 by asserting an ad hoc state of mode select (MSEL) signal 824. In response, ad hoc controller 810 exchanges packets of data with other wireless clients according to an ad hoc network model (step 1008).

Wireless client 800 later receives another start beacon packet from the wireless access point (step 1002), which comprises a CAT value, as described above. Process 1000 then repeats as described above.

Figure 11:
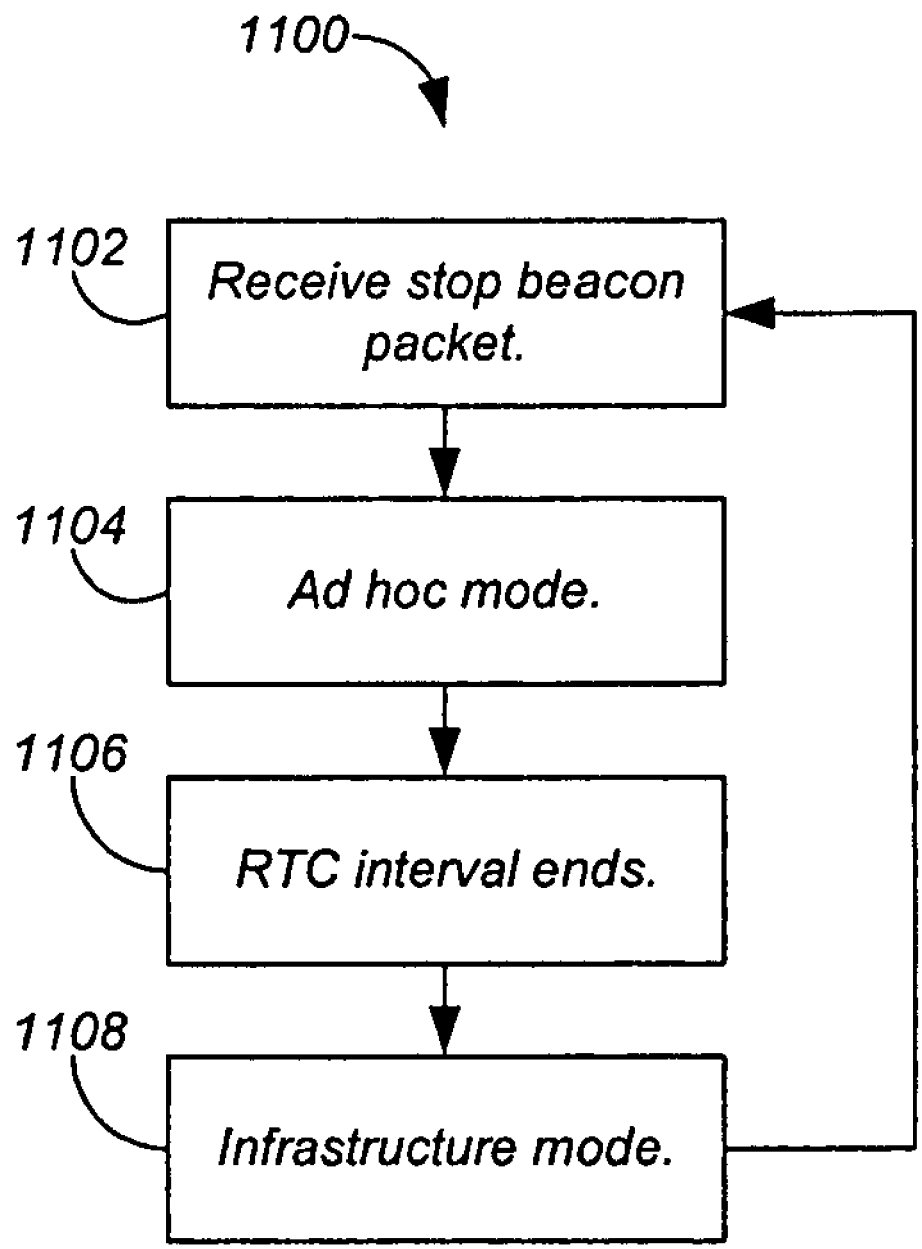
FIG. 11 shows a process for the wireless client of FIG. 8 using a stop beacon only according to a preferred embodiment of the present invention.

FIG. 11 shows a process 1100 for wireless client 800 of FIG. 8 using a stop beacon only according to a preferred embodiment of the present invention. Other embodiments of the present invention provide similar processes for other types of wireless end stations.

Wireless client 800 receives a stop beacon packet from the wireless access point (step 1102). The stop beacon comprises a RTC value, as described above. Wireless client 800 stores the RTC value in memory 814. The stop beacon packet indicates to wireless client 800 that wireless client 800 is now free to communicate with other wireless clients in its channel according to an ad hoc network model, such as the ad hoc wireless network model specified by IEEE standard 802.11, to enter a low-power sleep state, or to perform some other function.

In response to the stop beacon packet, master controller 808 selects ad hoc controller 810 by asserting an ad hoc state of mode select (MSEL) signal 824. In response, ad hoc controller 810 exchanges packets of data with other wireless clients according to an ad hoc network model (step 1104). Alternatively, master controller 808 can cause wireless client 800 to enter a low-power sleep state, or to perform some other function.

At the end of an interval beginning with receipt of the stop beacon packet and having a duration specified by the RTC value (step 1106), master controller 808 selects infrastructure controller 812 by asserting an infrastructure state of mode select (MSEL) signal 824. In response, infrastructure controller 812 exchanges packets of data with the wireless access point according to an infrastructure network model (step 1108).

Wireless client 800 later receives another stop beacon packet from the wireless access point (step 1102), which comprises a RTC value, as described above. Process 1100 then repeats as described above.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A wireless network apparatus comprising:
   a plurality of channel queues each to store packets of data to be transmitted on a respective wireless channel in one of a plurality of frequency bands, wherein at least two of the channel queues correspond to wireless channels in different ones of the frequency bands;
   a memory to store a channel access time value and a return to channel value for each of the wireless channels; and
   a controller to
      select one of the wireless channels according to a channel polling scheme,
      cause a start beacon packet to be sent to the selected one of the wireless channels,
      exchange packets of data with the selected one of the wireless channels for an interval specified by the channel access time value for the selected one of the wireless channels,
      cause a stop beacon packet to be sent to the selected one of the wireless channels at the end of the interval specified by the channel access time value for the selected one of the wireless channels, and
      cause a further start beacon packet to be sent to the selected one of the wireless channels at the end of an interval specified by the return to channel value for the selected one of the wireless channels.

2. The wireless network apparatus of claim 1:
   wherein the start beacon packet comprises the channel access time value for the selected one of the wireless channels.

3. The wireless network apparatus of claim 2:
   wherein the interval specified by the channel access time value begins with receipt of the start beacon packet.

4. The wireless network apparatus of claim 1:
   wherein the stop beacon packet comprises the return to channel value for the selected one of the wireless channels.

5. The wireless network apparatus of claim 4:
   wherein the interval specified by the return to channel value begins with receipt of the stop beacon packet.

6. The wireless network apparatus of claim 1:
   wherein one of the frequency bands is a 2.4 GHz band; and
   wherein another of the frequency bands is a 5 GHz band.

7. The wireless network apparatus of claim 6:
   wherein the 2.4 GHz band complies with IEEE standard 802.11; and
   wherein the 5 GHz band complies with IEEE standard 802.11a.

8. The wireless network apparatus of claim 1:
   wherein the channel polling scheme is an adaptive scheme based on traffic patterns learned by the controller.

9. A media access controller comprising the wireless network apparatus of claim 1.

10. A wireless access point comprising the media access controller of claim 9.

11. The wireless network apparatus of claim 1, further comprising:
    a physical-layer device comprising a plurality of wireless transceivers each to communicate over one of the wireless channels.

12. The wireless network apparatus of claim 11, further comprising:
    a baseband processor.

13. The wireless network apparatus of claim 1, further comprising:
    a media access controller to exchange packets of data with a wired network.

14. A wireless network apparatus according to claim 1 which is otherwise compliant with at least one standard selected from the group consisting of IEEE standards 802.11, 802.11a, 802.11b, 802.11g, 802.11n, 802.16, and 802.20.

15. A wireless network apparatus comprising:
    a plurality of channel queue means each for storing packets of data to be transmitted on a respective wireless channel in one of a plurality of frequency bands, wherein at least two of the channel queue means correspond to wireless channels in different ones of the frequency bands;
    memory means for storing a channel access time value and a return to channel value for each of the wireless channels; and
    controller means for
       selecting one of the wireless channels according to a channel polling scheme,
       causing a start beacon packet to be sent to the selected one of the wireless channels,
       exchanging packets of data with the selected one of the wireless channels for an interval specified by the channel access time value for the selected one of the wireless channels,
       causing a stop beacon packet to be sent to the selected one of the wireless channels at the end of the interval specified by the channel access time value for the selected one of the wireless channels, and
       causing a further start beacon packet to be sent to the selected one of the wireless channels at the end of an interval specified by the return to channel value for the selected one of the wireless channels.

16. The wireless network apparatus of claim 15:
    wherein the start beacon packet comprises the channel access time value for the selected one of the wireless channels.

17. The wireless network apparatus of claim 16:
    wherein the interval specified by the channel access time value begins with receipt of the start beacon packet.

18. The wireless network apparatus of claim 15:
wherein the stop beacon packet comprises the return to channel value for the selected one of the wireless channels.

19. The wireless network apparatus of claim 18:
wherein the interval specified by the return to channel value begins with receipt of the stop beacon packet.

20. The wireless network apparatus of claim 15:
wherein one of the frequency bands is a 2.4 GHz band; and
wherein another of the frequency bands is a 5 GHz band.

21. The wireless network apparatus of claim 20:
wherein the 2.4 GHz band complies with IEEE standard 802.11; and
wherein the 5 GHz band complies with IEEE standard 802.11a.

22. The wireless network apparatus of claim 15:
wherein the channel polling scheme is an adaptive scheme based on traffic patterns learned by the controller means.

23. A media access controller comprising the wireless network apparatus of claim 15.

24. A wireless access point comprising the media access controller of claim 23.

25. The wireless network apparatus of claim 15, further comprising:
physical-layer device means comprising a plurality of wireless transceiver means each for communicating over one of the wireless channels.

26. The wireless network apparatus of claim 25, further comprising: baseband processor means for communicating with the controller means.

27. The wireless network apparatus of claim 15, further comprising:
media access controller means for exchanging packets of data with a wired network.

28. A wireless network apparatus according to claim 15 which is otherwise compliant with at least one standard selected from the group consisting of IEEE standards 802.11, 802.11a, 802.11b, 802.11g, 802.11n, 802.16, and 802.20.

29. A method for a wireless network apparatus comprising:
storing, in a plurality of channel queues, packets of data to be transmitted on a respective wireless channel in one of a plurality of frequency bands, wherein at least two of the channel queues correspond to wireless channels in different ones of the frequency bands;
storing a channel access time value and a return to channel value for each of the wireless channels;
selecting one of the wireless channels according to a channel polling scheme;
causing a start beacon packet to be sent to the selected one of the wireless channels;
exchanging packets of data with the selected one of the wireless channels for an interval specified by the channel access time value for the selected one of the wireless channels;
causing a stop beacon packet to be sent to the selected one of the wireless channels at the end of the interval specified by the channel access time value for the selected one of the wireless channels; and
causing a further start beacon packet to be sent to the selected one of the wireless channels at the end of an interval specified by the return to channel value for the selected one of the wireless channels.

30. The method of claim 29:
wherein the start beacon packet comprises the channel access time value for the selected one of the wireless channels.

31. The method of claim 30:
wherein the interval specified by the channel access time value begins with receipt of the start beacon packet.

32. The method of claim 29:
wherein the stop beacon packet comprises the return to channel value for the selected one of the wireless channels.

33. The method of claim 32:
wherein the interval specified by the return to channel value begins with receipt of the stop beacon packet.

34. The method of claim 29:
wherein one of the frequency bands is a 2.4 GHz band; and
wherein another of the frequency bands is a 5 GHz band.

35. The method of claim 34:
wherein the 2.4 GHz band complies with IEEE standard 802.11; and
wherein the 5 GHz band complies with IEEE standard 802.11a.

36. The method of claim 29:
wherein the channel polling scheme is an adaptive scheme based on learned traffic patterns.

37. The method of claim 29, further comprising:
exchanging packets of data with a wired network.

38. The method of claim 29, wherein the wireless network apparatus is otherwise compliant with at least one standard selected from the group consisting of IEEE standards 802.11, 802.11a, 802.11b, 802.11g, 802.11n, 802.16, and 802.20.

39. A computer program stored on a computer-readable medium embodying instructions, executable by a computer for a wireless network apparatus, for:
storing, in a plurality of channel queues, packets of data to be transmitted on a respective wireless channel in one of a plurality of frequency bands, wherein at least two of the channel queues correspond to wireless channels in different ones of the frequency bands;
storing a channel access time value and a return to channel value for each of the wireless channels;
selecting one of the wireless channels according to a channel polling scheme;
causing a start beacon packet to be sent to the selected one of the wireless channels;
causing packets of data to be exchanged with the selected one of the wireless channels for an interval specified by the channel access time value for the selected one of the wireless channels;
causing a stop beacon packet to be sent to the selected one of the wireless channels at the end of the interval specified by the channel access time value for the selected one of the wireless channels; and
causing a further start beacon packet to be sent to the selected one of the wireless channels at the end of an interval specified by the return to channel value for the selected one of the wireless channels.

40. The computer program of claim 39:
wherein the start beacon packet comprises the channel access time value for the selected one of the wireless channels.

41. The computer program of claim 40:
wherein the interval specified by the channel access time value begins with receipt of the start beacon packet.

42. The computer program of claim 39:
wherein the stop beacon packet comprises the return to channel value for the selected one of the wireless channels.

43. The computer program of claim 42:
wherein the interval specified by the return to channel value begins with receipt of the stop beacon packet.

44. The computer program of claim 39:
wherein one of the frequency bands is a 2.4 GHz band; and
wherein another of the frequency bands is a 5 GHz band.

45. The computer program of claim 44:
wherein the 2.4 GHz band complies with IEEE standard 802.11; and
wherein the 5 GHz band complies with IEEE standard 802.11a.

46. The computer program of claim 39:
wherein the channel polling scheme is an adaptive scheme based on learned traffic patterns.

47. The computer program of claim 39, further comprising instructions for:
causing packets of data to be exchanged with a wired network.

48. The computer program of claim 39, wherein the wireless network apparatus is otherwise compliant with at least one standard selected from the group consisting of IEEE standards 802.11, 802.11a, 802.11b, 802.11g, 802.11n, 802.16, and 802.20.

49. A wireless network apparatus comprising:
a plurality of channel queues each to store packets of data to be transmitted on a respective wireless channel in one of a plurality of frequency bands, wherein at least two of the channel queues correspond to wireless channels in different ones of the frequency bands;
a memory to store a channel access time value for each of the wireless channels; and
a controller to
select one of the wireless channels according to a channel polling scheme,
cause a start beacon packet to be sent to the selected one of the wireless channels, wherein the start beacon packet comprises the channel access time value for the selected one of the wireless channels, and
exchange packets of data with the selected one of the wireless channels for an interval specified by the channel access time value for the selected wireless channel.

50. The wireless network apparatus of claim 49:
wherein one of the frequency bands is a 2.4 GHz band; and
wherein another of the frequency bands is a 5 GHz band.

51. The wireless network apparatus of claim 50:
wherein the 2.4 GHz band complies with IEEE standard 802.11; and
wherein the 5 GHz band complies with IEEE standard 802.11a.

52. The wireless network apparatus of claim 49:
wherein the interval specified by the channel access time value begins with receipt of the start beacon packet.

53. The wireless network apparatus of claim 49:
wherein the channel polling scheme is an adaptive scheme based on traffic patterns learned by the controller.

54. A media access controller comprising the wireless network apparatus of claim 49.

55. A wireless access point comprising the media access controller of claim 54.

56. The wireless network apparatus of claim 49, further comprising:
a physical-layer device comprising a plurality of wireless transceivers each to communicate over one of the wireless channels.

57. The wireless network apparatus of claim 56, further comprising:
a baseband processor.

58. The wireless network apparatus of claim 49, further comprising:
a media access controller to exchange packets of data with a wired network.

59. A wireless network apparatus according to claim 49 which is otherwise compliant with at least one standard selected from the group consisting of IEEE standards 802.11, 802.11a, 802.11b, 802.11g, 802.11n, 802.16, and 802.20.

60. A wireless network apparatus comprising:
a plurality of channel queue means each for storing packets of data to be transmitted on a respective wireless channel in one of a plurality of frequency bands, wherein at least two of the channel queue means correspond to wireless channels in different ones of the frequency bands;
memory means for storing a channel access time value for each of the wireless channels; and
controller means for
selecting one of the wireless channels according to a channel polling scheme,
causing a start beacon packet to be sent to the selected one of the wireless channels, wherein the start beacon packet comprises the channel access time value for the selected one of the wireless channels, and
exchanging packets of data with the selected one of the wireless channels for an interval specified by the channel access time value for the selected wireless channel.

61. The wireless network apparatus of claim 60:
wherein one of the frequency bands is a 2.4 GHz band; and
wherein another of the frequency bands is a 5 GHz band.

62. The wireless network apparatus of claim 61:
wherein the 2.4 GHz band complies with IEEE standard 802.11; and
wherein the 5 GHz band complies with IEEE standard 802.11a.

63. The wireless network apparatus of claim 60:
wherein the interval specified by the channel access time value begins with receipt of the start beacon packet.

64. The wireless network apparatus of claim 60:
wherein the channel polling scheme is an adaptive scheme based on traffic patterns learned by the controller means.

65. A media access controller comprising the wireless network apparatus of claim 60.

66. A wireless access point comprising the media access controller of claim 65.

67. The wireless network apparatus of claim 60, further comprising:
physical-layer device means comprising a plurality of wireless transceiver means each for communicating over one of the wireless channels.

68. The wireless network apparatus of claim 67, further comprising: baseband processor means for communicating with the controller means.

69. The wireless network apparatus of claim 60, further comprising:
media access controller means for exchanging packets of data with a wired network.

70. A wireless network apparatus according to claim 60 which is otherwise compliant with at least one standard selected from the group consisting of IEEE standards 802.11, 802.11a, 802.11b, 802.11g, 802.11n, 802.16, and 802.20.

71. A method for a wireless network apparatus comprising:
storing, in a plurality of channel queues, packets of data to be transmitted on a respective wireless channel in one of a plurality of frequency bands, wherein at least two of the channel queues correspond to wireless channels in different ones of the frequency bands;
storing a channel access time value for each of the wireless channels;

selecting one of the wireless channels according to a channel polling scheme;

causing a start beacon packet to be sent to the selected one of the wireless channels, wherein the start beacon packet comprises the channel access time value for the selected one of the wireless channels; and exchanging packets of data with the selected one of the wireless channels for an interval specified by the channel access time value for the selected wireless channel.

72. The method of claim 71:

wherein one of the frequency bands is a 2.4 GHz band; and wherein another of the frequency bands is a 5 GHz band.

73. The method of claim 72:

wherein the 2.4 GHz band complies with IEEE standard 802.11; and wherein the 5 GHz band complies with IEEE standard 802.11a.

74. The method of claim 71:

wherein the interval specified by the return to channel value begins with receipt of the stop beacon packet.

75. The method of claim 71:

wherein the channel polling scheme is an adaptive scheme based on learned traffic patterns.

76. The method of claim 71, further comprising:

exchanging packets of data with a wired network.

77. The method of claim 71, wherein the wireless network apparatus is otherwise compliant with at least one standard selected from the group consisting of IEEE standards 802.11, 802.11a, 802.11b, 802.11g, 802.11n, 802.16, and 802.20.

78. A computer program stored on a computer-readable medium embodying instructions, executable by a computer for a wireless network apparatus, for:

storing, in a plurality of channel queues, packets of data to be transmitted on a respective wireless channel in one of a plurality of frequency bands, wherein at least two of the channel queues correspond to wireless channels in different ones of the frequency bands;

storing a channel access time value for each of the wireless channels;

selecting one of the wireless channels according to a channel polling scheme, and causing a start beacon packet to be sent to the selected one of the wireless channels, wherein the start beacon packet comprises a channel access time value for the selected one of the wireless channels; and causing packets of data to be exchanged with the selected one of the wireless channels for an interval specified by the channel access time value for the selected wireless channel.

79. The computer program of claim 78:

wherein one of the frequency bands is a 2.4 GHz band; and wherein another of the frequency bands is a 5 GHz band.

80. The computer program of claim 79:

wherein the 2.4 GHz band complies with IEEE standard 802.11; and wherein the 5 GHz band complies with IEEE standard 802.11a.

81. The computer program of claim 78:

wherein the interval specified by the return to channel value begins with receipt of the stop beacon packet.

82. The computer program of claim 78:

wherein the channel polling scheme is an adaptive scheme based on learned traffic patterns.

83. The computer program of claim 78, further comprising instructions for:

causing packets of data to be exchanged with a wired network.

84. The computer program of claim 78, wherein the wireless network apparatus is otherwise compliant with at least one standard selected from the group consisting of IEEE standards 802.11, 802.11a, 802.11b, 802.11g, 802.11n, 802.16, and 802.20.

85. A wireless network apparatus comprising:

a plurality of channel queues each to store packets of data to be transmitted on a respective wireless channel in one of a plurality of frequency bands, wherein at least two of the channel queues correspond to wireless channels in different ones of the frequency bands;

a memory to store a return to channel value for each of the wireless channels; and a controller to select one of the wireless channels according to a channel polling scheme; and exchange packets of data with the selected one of the wireless channels for a predetermined interval, cause a stop beacon packet to be sent to the selected one of the wireless channels at the end of the predetermined interval, wherein the stop beacon packet comprises the return to channel value for the selected one of the wireless channels; and resume exchanging packets of data with the selected one of the wireless channels after an interval specified by the return to channel value for the selected one of the wireless channels.

86. The wireless network apparatus of claim 85:

wherein one of the frequency bands is a 2.4 GHz band; and wherein another of the frequency bands is a 5 GHz band.

87. The wireless network apparatus of claim 86:

wherein the 2.4 GHz band complies with IEEE standard 802.11; and wherein the 5 GHz band complies with IEEE standard 802.11a.

88. The wireless network apparatus of claim 85:

wherein the interval specified by the return to channel value begins with receipt of the stop beacon packet.

89. The wireless network apparatus of claim 85:

wherein the channel polling scheme is an adaptive scheme based on traffic patterns learned by the controller.

90. A media access controller comprising the wireless network apparatus of claim 85.

91. A wireless access point comprising the media access controller of claim 90.

92. The wireless network apparatus of claim 85, further comprising:

a physical-layer device comprising a plurality of wireless transceivers each to communicate over one of the wireless channels.

93. The wireless network apparatus of claim 92, further comprising:

a baseband processor.

94. The wireless network apparatus of claim 85, further comprising:

a media access controller to exchange packets of data with a wired network.

95. A wireless network apparatus according to claim 85 which is otherwise compliant with at least one standard selected from the group consisting of IEEE standards 802.11, 802.11a, 802.11b, 802.11g, 802.11n, 802.16, and 802.20.

96. A wireless network apparatus comprising:

a plurality of channel queue means each for storing packets of data to be transmitted on a respective wireless channel in one of a plurality of frequency bands, wherein at least two of the channel queues correspond to wireless channels in different ones of the frequency bands;

memory means for storing a return to channel value for each of the wireless channels; and
controller means for
selecting one of the wireless channels according to a channel polling scheme; and
exchanging packets of data with the selected one of the wireless channels for a predetermined interval,
causing a stop beacon packet to be sent to the selected one of the wireless channels at the end of the predetermined interval, wherein the stop beacon packet comprises the return to channel value for the selected one of the wireless channels; and
resuming exchanging packets of data with the selected one of the wireless channels after an interval specified by the return to channel value for the selected one of the wireless channels.

97. The wireless network apparatus of claim 96:
wherein one of the frequency bands is a 2.4 GHz band; and
wherein another of the frequency bands is a 5 GHz band.

98. The wireless network apparatus of claim 97:
wherein the 2.4 GHz band complies with IEEE standard 802.11; and
wherein the 5 GHz band complies with IEEE standard 802.11a.

99. The wireless network apparatus of claim 96:
wherein the interval specified by the return to channel value begins with receipt of the stop beacon packet.

100. The wireless network apparatus of claim 96:
wherein the channel polling scheme is an adaptive scheme based on traffic patterns learned by the controller means.

101. A media access controller comprising the wireless network apparatus of claim 96.

102. A wireless access point comprising the media access controller of claim 101.

103. The wireless network apparatus of claim 96, further comprising:
physical-layer device means comprising a plurality of wireless transceiver means each for communicating over one of the wireless channels.

104. The wireless network apparatus of claim 103, further comprising:
baseband processor means for communicating with the controller means.

105. The wireless network apparatus of claim 96, further comprising:
media access controller means for exchanging packets of data with a wired network.

106. A wireless network apparatus according to claim 96 which is otherwise compliant with at least one standard selected from the group consisting of IEEE standards 802.11, 802.11a, 802.11b, 802.11g, 802.11n, 802.16, and 802.20.

107. A method comprising:
storing, in a plurality of channel queues, packets of data to be transmitted on a respective wireless channel in one of a plurality of frequency bands, wherein at least two of the channel queues correspond to wireless channels in different ones of the frequency bands;
storing a channel access time value for each of the wireless channels;
selecting one of the wireless channels according to a channel polling scheme;
exchanging packets of data with the selected one of the wireless channels for a predetermined interval;
causing a stop beacon packet to be sent to the selected one of the wireless channels at the end of the predetermined interval, wherein the stop beacon packet comprises a return to channel value for the selected one of the wireless channels; and
exchanging packets of data with the selected one of the wireless channels after an interval specified by the return to channel value for the selected one of the wireless channels.

108. The method of claim 107:
wherein one of the frequency bands is a 2.4 GHz band; and
wherein another of the frequency bands is a 5 GHz band.

109. The method of claim 108:
wherein the 2.4 GHz band complies with IEEE standard 802.11; and
wherein the 5 GHz band complies with IEEE standard 802.11a.

110. The method of claim 107:
wherein the interval specified by the return to channel value begins with receipt of the stop beacon packet.

111. The method of claim 107:
wherein the channel polling scheme is an adaptive scheme based on traffic patterns learned.

112. The method of claim 107, further comprising:
exchanging packets of data with a wired network.

113. The method of claim 107, wherein the wireless network apparatus is otherwise compliant with at least one standard selected from the group consisting of IEEE standards 802.11, 802.11a, 802.11b, 802.11g, 802.11n, 802.16, and 802.20.

114. A computer program stored on a computer-readable medium embodying instructions, executable by a computer, for:
storing, in a plurality of channel queues, packets of data to be transmitted on a respective wireless channel in one of a plurality of frequency bands, wherein at least two of the channel queues correspond to wireless channels in different ones of the frequency bands;
storing a channel access time value for each of the wireless channels;
selecting one of the wireless channels according to a channel polling scheme;
causing packets of data to be exchanged with the selected one of the wireless channels for a predetermined interval;
causing a stop beacon packet to be sent to the selected one of the wireless channels at the end of the predetermined interval, wherein the stop beacon packet comprises a return to channel value for the selected one of the wireless channels; and
exchanging packets of data with the selected one of the wireless channels after an interval specified by the return to channel value for the selected one of the wireless channels.

115. The computer program of claim 114:
wherein one of the frequency bands is a 2.4 GHz band; and
wherein another of the frequency bands is a 5 GHz band.

116. The computer program of claim 115:
wherein the 2.4 GHz band complies with IEEE standard 802.11; and
wherein the 5 GHz band complies with IEEE standard 802.11a.

117. The computer program of claim 114:
wherein the interval specified by the return to channel value begins with receipt of the stop beacon packet.

118. The computer program of claim 114:
wherein the channel polling scheme is an adaptive scheme based on traffic patterns learned.

119. The computer program of claim 114, further comprising instructions for:
  causing packets of data to be exchanged with a wired network.

120. The computer program of claim 114, wherein the wireless network apparatus is otherwise compliant with at least one standard selected from the group consisting of IEEE standards 802.11, 802.11a, 802.11b, 802.11g, 802.11n, 802.16, and 802.20.

121. A wireless network apparatus comprising:
  an infrastructure controller to exchange packets of data with a wireless base station over a wireless channel, and to receive start beacon packets and stop beacon packets from the wireless base station;
  an ad hoc controller to exchange packets of data with one or more wireless end stations over the wireless channel; and
  a master controller to cause the infrastructure controller to exchange packets of data with the wireless base station over the wireless channel only after receiving one of the start beacon packets and before receiving a next one of the stop beacon packets, and to cause the ad hoc controller to exchange packets of data with the one or more wireless end stations over the wireless channel only after receiving one of the stop beacon packets and before receiving a next one of the start beacon packets.

122. The wireless network apparatus of claim 121:
  wherein the start beacon packet comprises a channel access time value; and
  wherein the master controller causes the infrastructure controller to exchange packets of data with the wireless base station over the wireless channel only during an interval specified by the channel access time value.

123. The wireless network apparatus of claim 122:
  wherein the interval specified by the channel access time value begins with receipt of the start beacon packet.

124. The wireless network apparatus of claim 121:
  wherein the stop beacon packet comprising a return to channel value; and
  wherein the master controller causes the ad hoc controller to exchange packets of data with the one or more wireless end stations over the wireless channel only during an interval specified by the return to channel value.

125. The wireless network apparatus of claim 124:
  wherein the interval specified by the return to channel value begins with receipt of the stop beacon packet.

126. A media access controller comprising the wireless network apparatus of claim 121.

127. A wireless client comprising the media access controller of claim 126.

128. The wireless network apparatus of claim 121, further comprising:
  a physical-layer device comprising a wireless transceiver to communicate over the wireless channel.

129. The wireless network apparatus of claim 128, further comprising:
  a baseband processor.

130. A wireless network apparatus according to claim 121 which is otherwise compliant with at least one standard selected from the group consisting of IEEE standards 802.11, 802.11a, 802.11b, 802.11g, 802.11n, 802.16, and 802.20.

131. A wireless network apparatus comprising:
  infrastructure controller means for exchanging packets of data with a wireless base station over a wireless channel, and for receiving start beacon packets and stop beacon packets from the wireless base station;
  ad hoc controller means for exchanging packets of data with one or more wireless end stations over the wireless channel; and
  master controller means for causing the infrastructure controller to exchange packets of data with the wireless base station over the wireless channel only after receiving one of the start beacon packets and before receiving a next one of the stop beacon packets, and for causing the ad hoc controller to exchange packets of data with the one or more wireless end stations over the wireless channel only after receiving one of the stop beacon packets and before receiving a next one of the start beacon packets.

132. The wireless network apparatus of claim 131:
  wherein the start beacon packet comprises a channel access time value; and
  wherein the master controller means causes the infrastructure controller to exchange packets of data with the wireless base station over the wireless channel only during an interval specified by the channel access time value.

133. The wireless network apparatus of claim 132:
  wherein the interval specified by the channel access time value begins with receipt of the start beacon packet.

134. The wireless network apparatus of claim 131:
  wherein the stop beacon packet comprising a return to channel value; and
  wherein the master controller means causes the ad hoc controller to exchange packets of data with the one or more wireless end stations over the wireless channel only during an interval specified by the return to channel value.

135. The wireless network apparatus of claim 134:
  wherein the interval specified by the return to channel value begins with receipt of the stop beacon packet.

136. A media access controller comprising the wireless network apparatus of claim 131.

137. A wireless client comprising the media access controller of claim 136.

138. The wireless network apparatus of claim 131, further comprising:
  physical-layer device means comprising a wireless transceiver means for communicating over the wireless channel.

139. The wireless network apparatus of claim 138, further comprising:
  baseband processor means for communicating with the infrastructure controller means and the ad hoc controller means.

140. A wireless network apparatus according to claim 131 which is otherwise compliant with at least one standard selected from the group consisting of IEEE standards 802.11, 802.11a, 802.11b, 802.11g, 802.11n, 802.16, and 802.20.

141. A method for a wireless network apparatus comprising:
  receiving one or more start beacon packets;
  receiving one or more stop beacon packets;
  exchanging packets of data with the wireless base station according to an infrastructure network model only after receiving one of the start beacon packets and before receiving a next one of the stop beacon packets; and
  exchanging packets of data with the one or more wireless end stations according to an ad hoc network model only after receiving one of the stop beacon packets and before receiving a next one of the start beacon packets.

142. The method of claim 141:
  wherein the one or more start beacon packets comprise a channel access time value.

143. The method of claim 142:
wherein the interval specified by the channel access time value begins with receipt of the start beacon packet.

144. The method of claim 141:
wherein the one or more stop beacon packets comprise a return to channel value.

145. The method of claim 144:
wherein the interval specified by the return to channel value begins with receipt of the stop beacon packet.

146. The method of claim 141, wherein the wireless network apparatus is otherwise compliant with at least one standard selected from the group consisting of IEEE standards 802.11, 802.11a, 802.11b, 802.11g, 802.11n, 802.16, and 802.20.

147. A computer program stored on a computer-readable medium embodying instructions, executable by a computer for a wireless network apparatus, for:
receiving one or more start beacon packets;
receiving one or more stop beacon packets;
causing packets of data to be exchanged with the wireless base station according to an infrastructure network model only after receiving one of the start beacon packets and before receiving a next one of the stop beacon packets; and
causing packets of data to be exchanged with the one or more wireless end stations according to an ad hoc network model only after receiving one of the stop beacon packets and before receiving a next one of the start beacon packets.

148. The computer program of claim 147:
wherein the one or more start beacon packets comprise a channel access time value.

149. The computer program of claim 148:
wherein the interval specified by the channel access time value begins with receipt of the start beacon packet.

150. The computer program of claim 147:
wherein the one or more stop beacon packets comprise a return to channel value.

151. The computer program of claim 150:
wherein the interval specified by the return to channel value begins with receipt of the stop beacon packet.

152. The computer program of claim 147, wherein the wireless network apparatus is otherwise compliant with at least one standard selected from the group consisting of IEEE standards 802.11, 802.11a, 802.11b, 802.11g, 802.11n, 802.16, and 802.20.

153. A wireless network apparatus comprising:
an infrastructure controller to exchange packets of data with a wireless base station over a wireless channel, and to receive start beacon packets and stop beacon packets from the wireless base station; and
a master controller to cause the infrastructure controller to exchange packets of data with the wireless base station over the wireless channel only after receiving one of the start beacon packets and before receiving a next one of the stop beacon packets, and to cause the wireless network apparatus to enter a sleep state on receiving one of the stop beacon packets, and to leave the sleep state on receiving a next one of the start beacon packets.

154. The wireless network apparatus of claim 153:
wherein the start beacon packet comprises a channel access time value; and
wherein the master controller causes the infrastructure controller to exchange packets of data with the wireless base station over the wireless channel only during an interval specified by the channel access time value.

155. The wireless network apparatus of claim 154:
wherein the interval specified by the channel access time value begins with receipt of the start beacon packet.

156. The wireless network apparatus of claim 153:
wherein the stop beacon packet comprising a return to channel value; and
wherein the master controller causes the wireless network apparatus to remain in the sleep state only during an interval specified by the return to channel value.

157. The wireless network apparatus of claim 156:
wherein the interval specified by the return to channel value begins with receipt of the stop beacon packet.

158. A media access controller comprising the wireless network apparatus of claim 153.

159. A wireless client comprising the media access controller of claim 158.

160. The wireless network apparatus of claim 153, further comprising:
a physical-layer device comprising a wireless transceiver to communicate over the wireless channel.

161. The wireless network apparatus of claim 160, further comprising:
a baseband processor.

162. A wireless network apparatus according to claim 153 which is otherwise compliant with at least one standard selected from the group consisting of IEEE standards 802.11, 802.11a, 802.11b, 802.11g, 802.11n, 802.16, and 802.20.

163. A wireless network apparatus comprising:
infrastructure controller means for exchanging packets of data with a wireless base station over a wireless channel, and for receiving start beacon packets and stop beacon packets from the wireless base station; and
master controller means for causing the infrastructure controller to exchange packets of data with the wireless base station over the wireless channel only after receiving one of the start beacon packets and before receiving a next one of the stop beacon packets, and for causing the wireless network apparatus to enter a sleep state on receiving one of the stop beacon packets, and to leave the sleep state on receiving a next one of the start beacon packets.

164. The wireless network apparatus of claim 163:
wherein the start beacon packet comprises a channel access time value; and
wherein the master controller means causes the infrastructure controller means to exchange packets of data with the wireless base station over the wireless channel only during an interval specified by the channel access time value.

165. The wireless network apparatus of claim 164:
wherein the interval specified by the channel access time value begins with receipt of the start beacon packet.

166. The wireless network apparatus of claim 163:
wherein the stop beacon packet comprising a return to channel value; and
wherein the master controller means causes the wireless network apparatus to remain in the sleep state only during an interval specified by the return to channel value.

167. The wireless network apparatus of claim 166:
wherein the interval specified by the return to channel value begins with receipt of the stop beacon packet.

168. A media access controller comprising the wireless network apparatus of claim 163.

169. A wireless client comprising the media access controller of claim 168.

170. The wireless network apparatus of claim 163, further comprising:

physical-layer device means comprising a wireless transceiver means for communicating over the wireless channel.

171. The wireless network apparatus of claim 170, further comprising:
baseband processor means for communicating with the infrastructure controller means and the ad hoc controller means.

172. A wireless network apparatus according to claim 163 which is otherwise compliant with at least one standard selected from the group consisting of IEEE standards 802.11, 802.11a, 802.11b, 802.11g, 802.11n, 802.16, and 802.20.

173. A method for a wireless network apparatus comprising:
receiving one or more start beacon packets;
receiving one or more stop beacon packets;
exchanging packets of data with the wireless base station according to an infrastructure network model only after receiving one of the start beacon packets and before receiving a next one of the stop beacon packets; and
entering a sleep state on receiving one of the stop beacon packets, and leaving the sleep state on receiving a next one of the start beacon packets.

174. The method of claim 173:
wherein the one or more start beacon packets comprise a channel access time value.

175. The method of claim 174:
wherein the interval specified by the channel access time value begins with receipt of the start beacon packet.

176. The method of claim 173:
wherein the one or more stop beacon packets comprise a return to channel value.

177. The method of claim 176:
wherein the interval specified by the return to channel value begins with receipt of the stop beacon packet.

178. The method of claim 173, wherein the wireless network apparatus is otherwise compliant with at least one standard selected from the group consisting of IEEE standards 802.11, 802.11a, 802.11b, 802.11g, 802.11n, 802.16, and 802.20.

179. A computer program stored on a computer-readable medium for a wireless network apparatus, the computer program comprising instructions for:
receiving one or more start beacon packets;
receiving one or more stop beacon packets;
causing packets of data to be exchanged with the wireless base station according to an infrastructure network model only after receiving one of the start beacon packets and before receiving a next one of the stop beacon packets; and
causing the wireless network apparatus to enter a sleep state on receiving one of the stop beacon packets, and leaving the sleep state on receiving a next one of the start beacon packets.

180. The computer program of claim 179:
wherein the one or more start beacon packets comprise a channel access time value.

181. The computer program of claim 180:
wherein the interval specified by the channel access time value begins with receipt of the start beacon packet.

182. The computer program of claim 179:
wherein the one or more stop beacon packets comprise a return to channel value.

183. The computer program of claim 182:
wherein the interval specified by the return to channel value begins with receipt of the stop beacon packet.

184. The computer program of claim 179, wherein the wireless network apparatus is otherwise compliant with at least one standard selected from the group consisting of IEEE standards 802.11, 802.11a, 802.11b, 802.11g, 802.11n, 802.16, and 802.20.

185. A wireless network apparatus comprising:
an infrastructure controller to exchange packets of data with a wireless base station over a wireless channel;
an ad hoc controller to exchange packets of data with one or more wireless end stations over the wireless channel;
wherein the infrastructure controller receives a start beacon packet from the wireless base station, the start beacon packet comprising a channel access time value;
a memory to store the channel access time value; and
a master controller to cause the infrastructure controller to exchange packets of data with the wireless base station over the wireless channel only during an interval specified by the channel access time value, and to cause the ad hoc controller to exchange packets of data with the one or more wireless end stations over the wireless channel thereafter.

186. The wireless network apparatus of claim 185:
wherein the interval specified by the channel access time value begins with receipt of the start beacon packet.

187. A media access controller comprising the wireless network apparatus of claim 185.

188. A wireless client comprising the media access controller of claim 187.

189. The wireless network apparatus of claim 185, further comprising:
a physical-layer device comprising a wireless transceiver to communicate over the wireless channel.

190. The wireless network apparatus of claim 189, further comprising:
a baseband processor.

191. A wireless network apparatus according to claim 185 which is otherwise compliant with at least one standard selected from the group consisting of IEEE standards 802.11, 802.11a, 802.11b, 802.11g, 802.11n, 802.16, and 802.20.

192. A wireless network apparatus comprising:
infrastructure controller means for exchanging packets of data with a wireless base station over a wireless channel;
ad hoc controller means for exchanging packets of data with one or more wireless end stations over the wireless channel;
wherein the infrastructure controller means receives a start beacon packet from the wireless base station, the start beacon packet comprising a channel access time value;
memory means for storing the channel access time value; and
master controller means for causing the infrastructure controller means to exchange packets of data with the wireless base station over the wireless channel only during an interval specified by the channel access time value, and for causing the ad hoc controller to exchange packets of data with the one or more wireless end stations over the wireless channel thereafter.

193. The wireless network apparatus of claim 192:
wherein the interval specified by the channel access time value begins with receipt of the start beacon packet.

194. A media access controller comprising the wireless network apparatus of claim 192.

195. A wireless client comprising the media access controller of claim 194.

196. The wireless network apparatus of claim 192, further comprising:

physical-layer device means comprising wireless transceiver means for communicating over the wireless channel.

197. The wireless network apparatus of claim 196, further comprising:
baseband processor means for communicating with the infrastructure controller means and the ad hoc controller means.

198. A wireless network apparatus according to claim 192 which is otherwise compliant with at least one standard selected from the group consisting of IEEE standards 802.11, 802.11a, 802.11b, 802.11g, 802.11n, 802.16, and 802.20.

199. A method for a wireless network apparatus comprising:
receiving a start beacon packet comprising a channel access time value;
exchanging packets of data over a wireless channel according to an infrastructure network model only during an interval specified by the channel access time value; and
exchanging packets of data over the wireless channel according to an ad hoc network model thereafter.

200. The method of claim 199:
wherein the interval specified by the channel access time value begins with receipt of the start beacon packet.

201. The method of claim 199, wherein the wireless network apparatus is otherwise compliant with at least one standard selected from the group consisting of IEEE standards 802.11, 802.11a, 802.11b, 802.11g, 802.11n, 802.16, and 802.20.

202. A computer program stored on a computer-readable medium for a wireless network apparatus, the computer program comprising instructions for:
receiving a start beacon packet comprising a channel access time value;
causing packets of data to be exchanged over a wireless channel according to an infrastructure network model only during an interval specified by the channel access time value; and
causing packets of data to be exchanged over the wireless channel according to an ad hoc network model thereafter.

203. The computer program of claim 202:
wherein the interval specified by the channel access time value begins with receipt of the start beacon packet.

204. The computer program of claim 202, wherein the wireless network apparatus is otherwise compliant with at least one standard selected from the group consisting of IEEE standards 802.11, 802.11a, 802.11b, 802.11g, 802.11n, 802.16, and 802.20.

205. A wireless network apparatus comprising:
an infrastructure controller to exchange packets of data with a wireless base station over a wireless channel;
wherein the infrastructure controller receives a start beacon packet from the wireless base station, the start beacon packet comprising a channel access time value;
a memory to store the channel access time value; and
a master controller to cause the infrastructure controller to exchange packets of data with the wireless base station over the wireless channel only during an interval specified by the channel access time value, and to cause the wireless network apparatus to operate in a sleep state thereafter.

206. The wireless network apparatus of claim 205:
wherein the interval specified by the channel access time value begins with receipt of the start beacon packet.

207. A media access controller comprising the wireless network apparatus of claim 205.

208. A wireless client comprising the media access controller of claim 207.

209. The wireless network apparatus of claim 205, further comprising:
a physical-layer device comprising a wireless transceiver to communicate over the wireless channel.

210. The wireless network apparatus of claim 209, further comprising:
a baseband processor.

211. A wireless network apparatus according to claim 205 which is otherwise compliant with at least one standard selected from the group consisting of IEEE standards 802.11, 802.11a, 802.11b, 802.11g, 802.11n, 802.16, and 802.20.

212. A wireless network apparatus comprising:
infrastructure controller means for exchanging packets of data with a wireless base station over a wireless channel;
wherein the infrastructure controller means receives a start beacon packet from the wireless base station, the start beacon packet comprising a channel access time value;
memory means for storing the channel access time value; and
master controller means for causing the infrastructure controller means to exchange packets of data with the wireless base station over the wireless channel only during an interval specified by the channel access time value, and for causing the wireless network apparatus to operate in a sleep state thereafter.

213. The wireless network apparatus of claim 212:
wherein the interval specified by the channel access time value begins with receipt of the start beacon packet.

214. A media access controller comprising the wireless network apparatus of claim 212.

215. A wireless client comprising the media access controller of claim 214.

216. The wireless network apparatus of claim 212, further comprising:
physical-layer device means comprising wireless transceiver means for communicating over the wireless channel.

217. The wireless network apparatus of claim 216, further comprising:
baseband processor means for communicating with the infrastructure controller means.

218. A wireless network apparatus according to claim 212 which is otherwise compliant with at least one standard selected from the group consisting of IEEE standards 802.11, 802.11a, 802.11b, 802.11g, 802.11n, 802.16, and 802.20.

219. A method for a wireless network apparatus comprising:
receiving a start beacon packet comprising a channel access time value;
exchanging packets of data over a wireless channel according to an infrastructure network model only during an interval specified by the channel access time value; and
operating in a sleep state thereafter.

220. The method of claim 219:
wherein the interval specified by the channel access time value begins with receipt of the start beacon packet.

221. The method of claim 219, wherein the wireless network apparatus is otherwise compliant with at least one standard selected from the group consisting of IEEE standards 802.11, 802.11a, 802.11b, 802.11g, 802.11n, 802.16, and 802.20.

222. A computer program stored on a computer-readable medium for a wireless network apparatus, the computer program comprising instructions for:

receiving a start beacon packet comprising a channel access time value;
exchanging packets of data over a wireless channel according to an infrastructure network model only during an interval specified by the channel access time value; and operating in a sleep state thereafter.

223. The computer program of claim 222:
wherein the interval specified by the channel access time value begins with receipt of the start beacon packet.

224. The computer program of claim 222, wherein the wireless network apparatus is otherwise compliant with at least one standard selected from the group consisting of IEEE standards 802.11, 802.11a, 802.11b, 802.11g, 802.11n, 802.16, and 802.20.

225. A wireless network apparatus comprising:
an infrastructure controller to exchange packets of data with a wireless base station over a wireless channel;
an ad hoc controller to exchange packets of data with one or more wireless end stations over the wireless channel;
wherein the infrastructure controller receives a stop beacon packet from the wireless base station, the stop beacon packet comprising a return to channel value;
a memory to store the return to channel value; and
a master controller to cause the ad hoc controller to exchange packets of data with the one or more wireless end stations over the wireless channel only during an interval specified by the return to channel value, and to cause the infrastructure controller to exchange packets of data with the wireless base station over the wireless channel thereafter.

226. The wireless network apparatus of claim 225:
wherein the interval specified by the return to channel value begins with receipt of the stop beacon packet.

227. A media access controller comprising the wireless network apparatus of claim 225.

228. A wireless client comprising the media access controller of claim 227.

229. The wireless network apparatus of claim 225, further comprising:
a physical-layer device comprising a wireless transceiver to communicate over the wireless channel.

230. The wireless network apparatus of claim 229, further comprising:
a baseband processor.

231. A wireless network apparatus according to claim 225 which is otherwise compliant with at least one standard selected from the group consisting of IEEE standards 802.11, 802.11a, 802.11b, 802.11g, 802.11n, 802.16, and 802.20.

232. A wireless network apparatus comprising:
infrastructure controller means for exchanging packets of data with a wireless base station over a wireless channel;
ad hoc controller means for exchanging packets of data with one or more wireless end stations over the wireless channel;
wherein the infrastructure controller means receives a stop beacon packet from the wireless base station, the stop beacon packet comprising a return to channel value;
memory means for storing the return to channel value; and
master controller means for causing the ad hoc controller means to exchange packets of data with the one or more wireless end stations over the wireless channel only during an interval specified by the return to channel value, and for causing the infrastructure controller means to exchange packets of data with the wireless base station over the wireless channel thereafter.

233. The wireless network apparatus of claim 232:
wherein the interval specified by the return to channel value begins with receipt of the stop beacon packet.

234. A media access controller comprising the wireless network apparatus of claim 232.

235. A wireless client comprising the media access controller of claim 234.

236. The wireless network apparatus of claim 232, further comprising:
physical-layer device means comprising wireless transceiver means for communicating over the wireless channel.

237. The wireless network apparatus of claim 236, further comprising:
baseband processor means for communicating with the infrastructure controller means and the ad hoc controller means.

238. A wireless network apparatus according to claim 232 which is otherwise compliant with at least one standard selected from the group consisting of IEEE standards 802.11, 802.11a, 802.11b, 802.11g, 802.11n, 802.16, and 802.20.

239. A method for a wireless network apparatus comprising:
receiving a stop beacon packet comprising a return to channel value;
exchanging packets of data over the wireless channel according to an ad hoc network model only during an interval specified by the return to channel value; and
exchanging packets of data over a wireless channel according to an infrastructure network model thereafter.

240. The method of claim 239:
wherein the interval specified by the return to channel value begins with receipt of the stop beacon packet.

241. The method of claim 239, wherein the wireless network apparatus is otherwise compliant with at least one standard selected from the group consisting of IEEE standards 802.11, 802.11a, 802.11b, 802.11g, 802.11n, 802.16, and 802.20.

242. A computer program stored on a computer-readable medium for a wireless network apparatus, the computer program comprising instructions for:
receiving a stop beacon packet comprising a return to channel value;
causing packets of data to be exchanged over the wireless channel according to an ad hoc network model only during an interval specified by the return to channel value; and
causing packets of data to be exchanged over a wireless channel according to an infrastructure network model thereafter.

243. The computer program of claim 242:
wherein the interval specified by the return to channel value begins with receipt of the stop beacon packet.

244. The computer program of claim 242, wherein the wireless network apparatus is otherwise compliant with at least one standard selected from the group consisting of IEEE standards 802.11, 802.11a, 802.11b, 802.11g, 802.11n, 802.16, and 802.20.

245. A wireless network apparatus comprising:
an infrastructure controller to exchange packets of data with a wireless base station over a wireless channel;
wherein the infrastructure controller receives a stop beacon packet from the wireless base station, the stop beacon packet comprising a return to channel value;
a memory to store the return to channel value; and
a master controller to cause the wireless network apparatus to operate in a sleep state only during an interval specified by the return to channel value, and to cause the infrastructure controller to exchange packets of data with the wireless base station over the wireless channel thereafter.

246. The wireless network apparatus of claim 245:
wherein the interval specified by the return to channel value begins with receipt of the stop beacon packet.

247. A media access controller comprising the wireless network apparatus of claim 245.

248. A wireless client comprising the media access controller of claim 247.

249. The wireless network apparatus of claim 245, further comprising:
a physical-layer device comprising a wireless transceiver to communicate over the wireless channel.

250. The wireless network apparatus of claim 249, further comprising:
a baseband processor.

251. A wireless network apparatus according to claim 245 which is otherwise compliant with at least one standard selected from the group consisting of IEEE standards 802.11, 802.11a, 802.11b, 802.11g, 802.11n, 802.16, and 802.20.

252. A wireless network apparatus comprising:
infrastructure controller means for exchanging packets of data with a wireless base station over a wireless channel;
wherein the infrastructure controller means receives a stop beacon packet from the wireless base station, the stop beacon packet comprising a return to channel value;
memory means for storing the return to channel value; and
master controller means for causing the wireless network apparatus to operate in a sleep state only during an interval specified by the return to channel value, and for causing the infrastructure controller means to exchange packets of data with the wireless base station over the wireless channel thereafter.

253. The wireless network apparatus of claim 252:
wherein the interval specified by the return to channel value begins with receipt of the stop beacon packet.

254. A media access controller comprising the wireless network apparatus of claim 252.

255. A wireless client comprising the media access controller of claim 254.

256. The wireless network apparatus of claim 252, further comprising:
physical-layer device means comprising wireless transceiver means for communicating over the wireless channel.

257. The wireless network apparatus of claim 256, further comprising:
baseband processor means for communicating with the infrastructure controller means.

258. A wireless network apparatus according to claim 252 which is otherwise compliant with at least one standard selected from the group consisting of IEEE standards 802.11, 802.11a, 802.11b, 802.11g, 802.11n, 802.16, and 802.20.

259. A method for a wireless network apparatus comprising:
receiving a stop beacon packet comprising a return to channel value;
operating in a sleep state only during an interval specified by the return to channel value; and
exchanging packets of data over a wireless channel according to an infrastructure network model thereafter.

260. The method of claim 259:
wherein the interval specified by the return to channel value begins with receipt of the stop beacon packet.

261. The method of claim 259, wherein the wireless network apparatus is otherwise compliant with at least one standard selected from the group consisting of IEEE standards 802.11, 802.11a, 802.11b, 802.11g, 802.11n, 802.16, and 802.20.

262. A computer program stored on a computer-readable medium for a wireless network apparatus, the computer program comprising instructions for:
receiving a stop beacon packet comprising a return to channel value;
operating in a sleep state only during an interval specified by the return to channel value; and
causing packets of data to be exchanged over a wireless channel according to an infrastructure network model thereafter.

263. The computer program of claim 262:
wherein the interval specified by the return to channel value begins with receipt of the stop beacon packet.

264. The computer program of claim 262, wherein the wireless network apparatus is otherwise compliant with at least one standard selected from the group consisting of IEEE standards 802.11, 802.11a, 802.11b, 802.11g, 802.11n, 802.16, and 802.20.

265. A start beacon packet comprising a plurality of element fields, each element field comprising an element identification parameter, a length parameter, and an information parameter, wherein the information parameters comprise:
a service set identity (SSID) parameter;
a supported rates parameter;
a distribution set (DS) parameter set;
a traffic information map (TIM) parameter; and
a channel access time (CAT) parameter.

266. A stop beacon packet comprising a plurality of element fields, each element field comprising an element identification parameter, a length parameter, and an information parameter, wherein the information parameters comprise:
a service set identity (SSID) parameter;
a supported rates parameter;
a distribution set (DS) parameter set;
a traffic information map (TIM) parameter; and
a return to channel (RTC) parameter.

* * * * *